United States Patent
Matsui et al.

(10) Patent No.: US 6,841,261 B2
(45) Date of Patent: Jan. 11, 2005

(54) BLOCK COPOLYMER, COMPOSITION THEREOF, AND FILM MADE THEREOF

(75) Inventors: Masamitsu Matsui, Chiba (JP); Hideki Watanabe, Chiba (JP); Jun Yoshida, Chiba (JP); Hisakazu Hoshino, Chiba (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 82 days.

(21) Appl. No.: 10/415,662

(22) PCT Filed: Nov. 9, 2001

(86) PCT No.: PCT/JP01/09844

§ 371 (c)(1),
(2), (4) Date: May 8, 2003

(87) PCT Pub. No.: WO02/38642

PCT Pub. Date: May 16, 2002

(65) Prior Publication Data

US 2004/0102576 A1 May 27, 2004

(30) Foreign Application Priority Data

| Nov. 10, 2000 | (JP) | 2000-343139 |
| Jan. 29, 2001 | (JP) | 2001-019564 |
| Mar. 22, 2001 | (JP) | 2001-082539 |
| Sep. 19, 2001 | (JP) | 2001-284430 |
| Oct. 16, 2001 | (JP) | 2001-317984 |

(51) Int. Cl.[7] ............ B32B 27/08; C08L 53/02
(52) U.S. Cl. ............ 428/521; 428/517; 428/910; 525/71; 525/88; 525/89; 525/98; 525/180; 526/348.1; 526/347
(58) Field of Search ............ 525/71, 88, 89, 525/98, 180; 526/348.1, 347; 428/517, 910, 521

(56) References Cited

U.S. PATENT DOCUMENTS

| 3,872,068 A | | 3/1975 | Horiie et al. | |
| 4,089,913 A | * | 5/1978 | Miki et al. | 525/272 |
| 4,386,125 A | | 5/1983 | Shiraki et al. | |
| 4,987,194 A | * | 1/1991 | Maeda et al. | 525/314 |
| 5,583,182 A | | 12/1996 | Asahara et al. | |
| 5,756,577 A | | 5/1998 | Gutierrez-Villarreal | |
| 6,107,411 A | * | 8/2000 | Toya et al. | 525/316 |
| 2003/0158336 A1 | * | 8/2003 | Yaguchi et al. | 525/95 |
| 2004/0072957 A1 | * | 4/2004 | Terano et al. | 525/323 |
| 2004/0097658 A1 | * | 5/2004 | Everaerts et al. | 525/244 |
| 2004/0102576 A1 | * | 5/2004 | Matsui et al. | 525/180 |

FOREIGN PATENT DOCUMENTS

| EP | 0 362 850 | 4/1990 |
| EP | 0 852 240 | 7/1998 |
| GB | 1 422 030 | 1/1976 |
| GB | 2 245 574 | 1/1992 |
| JP | 60-097827 | 5/1985 |
| JP | 60-099116 | 6/1985 |
| WO | WO 91/13935 | 9/1991 |

OTHER PUBLICATIONS

Patent Abstracts of Japan, JP 07–216186, Aug. 15, 1995.
Patent Abstracts of Japan, JP 11–228783, Aug. 24, 1999.
Patent Abstracts of Japan, JP 07–097419, Apr. 11, 1995.
Patent Abstracts of Japan, JP 02–222440, Sep. 5, 1990.

* cited by examiner

Primary Examiner—D. Lawrence Tarazano
(74) Attorney, Agent, or Firm—Oblon, Spivak, McClelland, Maier & Neustadt, P.C.

(57) ABSTRACT

It is to provide a block copolymer and its copolymer composition which provides a heat shrinkable (multilayer) film with less spontaneous shrinkage while maintaining favorable low temperature shrinkability, and a heat shrinkable (multilayer) film containing the block copolymer. By using a block copolymer comprising a vinyl aromatic hydrocarbon and a conjugated diene characterized in that the relation of the loss tangent value obtained by dynamic viscoelasticity measurement with the temperature satisfies specific conditions, or a composition containing the copolymer composition as an essential component, a heat shrinkable (multilayer) film with less spontaneous shrinkability and less odor while maintaining favorable low temperature shrinkability can be obtained.

51 Claims, No Drawings

BLOCK COPOLYMER, COMPOSITION THEREOF, AND FILM MADE THEREOF

TECHNICAL FIELD

The present invention relates to a block copolymer of a vinyl aromatic hydrocarbon and a conjugated diene, having favorable transparency and impact resistance, and being excellent in film formability into a sheet or a film, and a resin composition containing it. Particularly, it relates to a block copolymer comprising a vinyl aromatic hydrocarbon and a conjugated diene, useful as a material for production of a heat shrinkable film, which has favorable shrinkability when used as a heat shrinkable film and which has low properties such that the heat shrinkable film slightly shrinks at a temperature of the shrinkage initiation temperature or under (hereinafter referred to as "spontaneous shrinkage") as compared with a conventional one, whereby shearing or distortion of printing caused by the spontaneous shrinkage or wrinkles at the time of shrinkage may further be suppressed, a polymer composition composed mainly of it, and a heat shrinkable (multilayer) film composed mainly of such a block copolymer and/or another polymer composition.

In the present invention, a membrane-like body having a thickness of at most 0.2 mm is referred to as a film, and one having a thickness exceeding 0.2 mm is referred to as a sheet.

BACKGROUND ART

It is known that when a vinyl aromatic hydrocarbon and a conjugated diene are subjected to block copolymerization by living anionic polymerization in an organic solvent using an alkyl lithium as an initiator, the structure of the copolymer can be diversified by a method of e.g. changing the weight ratio of the vinyl aromatic hydrocarbon to the conjugated diene or changing the manner of addition, whereby block copolymers having various physical properties can be obtained. In general, a block copolymer is a polymer having excellent impact resistance and transparency. If the content of the conjugated diene in the block copolymer is large, the copolymer tends to be a thermoplastic elastomer. On the other hand, if the content of the vinyl aromatic hydrocarbon is large, the copolymer tends to show characteristics as thermoplastics. To utilize such excellent characteristics, various production methods have been disclosed, for example, in JP-B-36-19286 and JP-B-48-4106.

The block copolymer comprising a vinyl aromatic hydrocarbon and a conjugated diene produced by these methods has a high transparency and favorable moldability, and therefore as disclosed in JP-B-63-49702, a heat shrinkable film having such characteristics that it shrinks in a short time at a temperature of at least the shrinkage initiation temperature, while it keeps the original shape at room temperature, can be obtained by using the resin as a raw material. This heat shrinkable film is produced by carrying out a processing operation wherein the resin extruded into a plate shape or a tube shape at a temperature of at least the softening point of the resin is oriented in a uniaxial or a biaxial direction to obtain a film, which is directly cooled to room temperature. By carrying out the series of processing operation including orienting, an individual molecule constituting the film is fixed as aligned in a specific direction, whereby the internal stress remains, and the heat shrinkable film is a film utilizing the shrinking phenomenon caused by that the above-described residual stress is relieved by re-heating.

Further, in addition to these excellent properties, it is excellent in miscibility with various vinyl aromatic hydrocarbon polymers, and it is thereby used for reinforcement, which is disclosed, for example, in JP-B-45-19388, JP-B-47-43618 and JP-B-51-27701. However, such block copolymers and compositions are relatively transparent, have favorable impact resistance and their oriented films show heat shrinkability, whereby they are favorably employed as various heat shrinkable packaging materials and labeling materials for beverage bottles on which tradenames and the like are printed. Particularly with respect to shrinkable labeling materials, as a result of increase in demand for plastic bottle beverages in recent years, line speed in a labeling step has been increased year by year, and reduction of time required for labeling and shrinkage has been attempted, and accordingly a film which requires a short time for heating, i.e. a film which shrinks at a low temperature, has been desired. However, a conventional film for shrink labels has a high heat shrinkage initiation temperature, and shrinkage at a relatively high temperature is required so as to obtain favorable shrinkage finish.

Further, if the molecular structure or the composition formulation is set so that the film starts to shrink at a low temperature merely by a conventional method, the heat shrinkable film shrinks during storage (so-called spontaneous shrinkage), thus causing printing slippage or labeling failure. As mentioned above, with respect to a film obtained by a conventional technique, no material having a balance among low temperature shrinkability and spontaneous shrinkage resistance, and outer appearance after shrinkage, has been obtained, and further, surface roughening may form on the film surface, thus impairing the outer appearance, in some cases. In JP-A-59-221348 and Japanese Patent No. 3,026,497, it has been studied to blend a styrene-acrylate type resin to obtain a multilayer film, from the viewpoint of reduction of spontaneous shrinkage and improvement in low temperature shrinkability of a styrene-butadiene block copolymer. However, it is not satisfactory from the viewpoint of e.g. needs for low temperature shrinkability in recent years and odor, and further, width of conditions at the time of orienting the film tends to be narrow, such being unsatisfactory.

It is an object of the present invention to provide a copolymer and its composition, capable of forming a film which satisfies needs such as low temperature shrinkability in recent years, spontaneous shrinkage resistance and reduction of odor, and which is excellent in outer appearance, for application as e.g. a heat shrinkable film, and a heat shrinkable film and a heat shrinkable multilayer film made of said copolymer or its composition.

DISCLOSURE OF THE INVENTION

Under these circumstances, in order to overcome the above problems, the present inventors have conducted detailed and extensive studies on a block copolymer and a composition comprising it, suitable as a raw material of a heat shrinkable film capable of forming an oriented film, which provides less odor, which has favorable low temperature shrinkability, which is less likely to undergo spontaneous shrinkage, and which is excellent in outer appearance. As a result, they have found that the above problems can be overcome by blending a block copolymer which satisfies a specific condition of the dynamic viscoelasticity characteristics, particularly the temperature dependency of the loss tangent value which shows a state of the block copolymer becoming softened. The present invention has been accomplished on the basis of this discovery.

The present invention may be classified into a block copolymer (A) according to claims 1 to 4 and a composition containing at least two types of the different block copolymers (A) according to claims 5 to 7 as a first invention, a composition containing the block copolymer (A) and a vinyl aromatic hydrocarbon polymer according to claims 8 and 9 as a second invention, a composition containing the block copolymer (A) and a block copolymer (A2) according to claims 10 to 13 as a third invention, a composition containing the block copolymer (A) and a block copolymer (A3) according to claims 14 to 17 as a fourth invention, a film or sheet made of the block copolymer (A) or the composition according to claims 18 to 31 as a fifth invention, and a method for producing the block copolymer (A) according to claims 32 and 33 as a sixth invention.

First, the block copolymer (A) and the composition containing at least two types of the different block copolymers (A) as the first invention will be explained below.

The block copolymer (A) of the present invention is a block copolymer (A) comprising a vinyl aromatic hydrocarbon and a conjugated diene, wherein the relation of the loss tangent value obtained by dynamic viscoelasticity measurement to the temperature satisfies (1) there is at least one maximum value within a temperature range of from 60 to 110° C., (2) the value of loss tangent at a temperature lower by 10° C. than the lowest temperature for the maximum value is at most 40% of the highest maximum value, and (3) the value of loss tangent at a temperature lower by 30° C. than the lowest temperature is at most 10% of the highest maximum value.

Further, in the relation of the loss tangent value obtained by dynamic viscoelasticity measurement of the block copolymer (A) to the temperature, the highest maximum value of the loss tangent value in a temperature range of from 60 to 110° C. is preferably within a range of from 0.5 to 4.0, and the loss tangent value at 30° C. is preferably within a range of at least 0.01 and less than 0.4.

The weight average molecular weight (Mw) of the block copolymer (A) of the first invention as measured by gel permeation chromatography (GPC) is preferably within a range of $100{,}000 \leq Mw \leq 300{,}000$, more preferably $120{,}000 \leq Mw \leq 250{,}000$, most preferably $150{,}000 \leq Mw1 \leq 220{,}000$. If Mw is less than 100,000, strength of the obtained copolymer may not satisfactory for practical use in some cases, and if it exceeds 300,000, the great force tends to be required when it is formed into a sheet or film, and it tends to be somewhat difficult to obtain a favorable product.

Further, it is preferred that the molecular structure of the block copolymer (A) is represented by the following formula, its weight average molecular weight is from 100,000 to 300,000, and conditions (a) to (c) are satisfied:

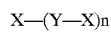

wherein n is an integer of at least 1:

(a) X is a block having a chain comprising one type or at least two types of vinyl aromatic hydrocarbons, (b) Y is a block containing at least one random copolymer segment of a conjugated diene and a vinyl aromatic hydrocarbon, each being of one type or at least two types, having a weight average molecular weight of from 40,000 to 250,000, and (c) when a molecular weight distribution of a polymer mixture comprising a vinyl aromatic hydrocarbon obtained by ozonolysis of the block copolymer is measured, the relation between the weight average molecular weight (Mw') of the polymer component showing the highest peak and the weight average molecular weight (Mw) of the block copolymer before the treatment is $0.1 \leq Mw'/Mw \leq 0.4$.

Block X may be obtained by polymerizing one type or at least two types of vinyl aromatic hydrocarbons, and it may be either a polymer block comprising a single vinyl aromatic hydrocarbon or a copolymer block comprising a plurality of vinyl aromatic hydrocarbons. Further, the structures, the compositions and the molecular weights of the plurality of blocks X, may be the same or different. The weight ratio of the block based on the whole is not limited, but it is preferably at least 2 wt % so as to later obtain strength as a molded product such as a film.

Block Y is obtained by polymerizing a conjugated diene and a vinyl aromatic hydrocarbon, each being of one type or at least two types. With respect to block Y also, in a case where n in the molecular structural formula X—(Y—X)n is at least 1, and a plurality of blocks Y is present, their structures, compositions and the molecular weights may be the same or different in the same manner as block X.

Copolymer block Y is required to contain at least one random copolymer segment of a vinyl aromatic hydrocarbon and a conjugated diene, having a weight average molecular weight of from 40,000 to 250,000. If it is at most 40,000, no balance between favorable heat shrinkability and spontaneous shrinkage will be obtained, and if it is at least 250,000, film formability tends to decrease, such being unfavorable. The weight average molecular weight of the random copolymer segment can be obtained in such a manner that each monomer is added in the polymerization step, and a small amount of the copolymer solution is taken out from the polymerization reactor before and after the step of completely polymerizing the monomers, and the solutions are subjected to molecular weight measurement by means of a gel permeation chromatography (hereinafter referred to as GPC measurement), and the weight average molecular weights are compared.

Further, in GPC measurement of the vinyl aromatic hydrocarbon polymer components obtained by ozonolysis of the block copolymer of the present invention, the relation of $0.1 \leq Mw'/Mw \leq 0.4$ is built up between the weight average molecular weight (Mw') corresponding to the highest peak of the molecular weight distribution curve and the weight average molecular weight (Mw) of the entire block copolymer. Namely, the ratio of the weight average molecular weight of the highest component among the vinyl aromatic hydrocarbon polymer components to the weight average molecular weight of the entire block copolymer is at least 0.1 and at most 0.4, preferably at least 0.2 and at most 0.35. If it is less than 0.1, film formability tends to decrease, and if it exceeds 0.4, heat shrinkability tends to decrease, and thus the effect of the present invention can hardly be obtained.

In the molecular structure of X—(Y—X)n of the present invention, block X comprising the vinyl aromatic hydrocarbon at each terminal functions as a physical crosslinking point between molecules, such being preferred in view of appearance of strength as the resin molded product. Further, block Y in the middle is characterized by containing at least one random copolymer segment comprising a vinyl aromatic hydrocarbon and a conjugated diene. By the presence of this segment, heat shrinkability and spontaneous shrinkage resistance can be well balanced. Further, with a purpose of further imparting "elongation" property and flexibility of the film, a chain comprising a conjugated diene may further be added to Y.

The weight average molecular weight of the conjugated diene polymer block in block Y can be obtained in such a manner that the conjugated diene monomer is added in a polymerization step, a small amount of the copolymer solution is taken out from the polymerization reactor before and after the step of completely polymerizing the monomer, and the solutions are subjected to GPC measurement, and the weight average molecular weights are compared.

The composition of the first invention is a block copolymer composition containing at least two types of the different block copolymers (A).

It is preferably a block copolymer composition wherein the relation of the loss tangent value obtained by dynamic viscoelasticity measurement of the composition to the temperature satisfies conditions (1) there is at least one maximum value within a temperature range of from 60 to 110° C., (2) the value of loss tangent at a temperature lower by 10° C. than the lowest temperature for the maximum value is at most 40% of the highest maximum value, and (3) the value of loss tangent at a temperature lower by 30° C. than the lowest temperature is at most 10% of the highest maximum value.

Now, the composition containing the block copolymer (A) and a vinyl aromatic hydrocarbon polymer according to the second invention will be explained below.

The composition is a composition containing the block copolymer (A) comprising a vinyl aromatic hydrocarbon and a conjugated diene and at least one member selected from the following vinyl aromatic hydrocarbon polymers (B1) to (B3):

(B1) a vinyl aromatic hydrocarbon polymer, (B2) a block copolymer of a vinyl aromatic hydrocarbon and a conjugated diene (excluding the block copolymer (A)), and (B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (a) forms a continuous phase and the rubber-like elastic body (b) forms a disperse phase, and the weight ratio is (a)/(b)=60/40 to 97/3.

The vinyl aromatic hydrocarbon polymers (B1) to (B3) will be explained hereinafter.

Now, the composition containing the block copolymer (A) and a block copolymer (A2) according to the third invention will be explained below.

Of the composition, the compositional ratio by weight of the block copolymer (A) to the following block copolymer (A2) is required to be within a range of $0.1 \leq A/(A+A2) \leq 0.95$:

The block copolymer (A2) is a block copolymer of a vinyl aromatic hydrocarbon and a conjugated diene, wherein in the relation of the loss tangent value obtained by dynamic viscoelasticity measurement to the temperature, there is at least one maximum value within a temperature range of from 63 to 120° C., and the lowest temperature for the maximum value of the loss tangent value within said range is higher by at least 3° C. than the lowest temperature for the maximum value of the loss tangent value of the block copolymer (A).

Particularly preferred is a copolymer composition comprising the block copolymer (A) and the block copolymer (A2), wherein in the relation of the loss tangent value obtained by dynamic viscoelasticity measurement to the temperature of the block copolymer (A2), the value of loss tangent at a temperature lower by 10° C. than the lowest temperature for the maximum value of the loss tangent value within a range of from 63 to 120° C., is at most 40% of the maximum value, and the value of loss tangent at a temperature lower by 30° C. than the lowest temperature is at most 10% of the maximum value.

Further, the composition according to the third invention may contain at most 100 parts by weight of at least one vinyl aromatic hydrocarbon resin selected from the following polymers (B1) to (B3) based on 100 parts by weight of the above copolymer composition comprising (A) and (A2):

(B1) a vinyl aromatic hydrocarbon polymer, (B2) a block copolymer of a vinyl aromatic hydrocarbon and a conjugated diene (excluding the block copolymer (A) and the block copolymer (A2)), (B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (a) forms a continuous phase and the rubber-like elastic body (b) forms a disperse phase, and the weight ratio is (a)/(b)=60/40 to 97/3.

The compositional ratio of the vinyl aromatic hydrocarbon and the conjugated diene in the block copolymers (A) and (A2) is not particularly limited, however, the weight ratio of the conjugated diene is preferably within a range of at least 5% and less than 40%, more preferably within a range of from 7% to 30%. The molecular weight is not particularly limited also, however, the weight average molecular weight by gel permeation chromatography (as calculated as polystyrene) is preferably at least 50,000 and less than 500,000, more preferably at least 100,000 and less than 300,000.

Now, the block copolymer (A2) of a vinyl aromatic hydrocarbon and a conjugated diene will be explained. This block copolymer is characterized by that in a relation of the loss tangent value obtained by dynamic viscoelasticity measurement to the temperature, there is at least one maximum value within a range of from 63 to 120° C., and the lowest temperature for the maximum value of the loss tangent value within said range is a temperature higher by at least 3° C., preferably by at least 5° C., more preferably by at least 10° C. and at most 30° C., than the lowest temperature for the maximum value of the loss tangent value as defined in the item for the block copolymer (A). By mixing the block copolymer (A2) of a vinyl aromatic hydrocarbon and a conjugated diene having such characteristics with the block copolymer (A), a resin composition excellent in processing properties such that it emits less odor, it is excellent in spontaneous shrinkage resistance and low temperature shrinkability, and the range of conditions particularly for orienting can be widened, can be obtained.

The block copolymer (A2) particularly preferably has a relation of the loss tangent value obtained by dynamic viscoelasticity measurement to the temperature such that the value of loss tangent at a temperature lower by 10° C. than the lowest temperature for the maximum value among maximum values within a temperature range of from 63 to 120° C., is at most 40% of the maximum value, and the value of loss tangent at a temperature lower by 30° C. than the lowest temperature is at most 10% of the maximum value, in view of spontaneous shrinkage resistance. The block copolymer having such characteristics can be produced in the same method as for the block copolymer (A) as mentioned hereinafter. The maximum value of the loss tangent value obtained by dynamic viscoelasticity measurement can be controlled by optionally changing the weight ratio of the vinyl aromatic hydrocarbon to the conjugated diene at the segment portion of the copolymer chain of the vinyl aromatic hydrocarbon and the conjugated diene.

In the third invention, the compositional ratio by weight of the block copolymer (A) to the block copolymer (A2) is within a range of $0.1 \leq A/(A+A2) \leq 0.95$, preferably $0.3 \leq A/(A+A2) \leq 0.9$, particularly preferably $0.5 \leq A/(A+A2) \leq 0.8$. By mixing such a polymer having a special relation of the loss tangent value obtained by dynamic viscoelasticity measurement to the temperature, a copolymer composition excellent in processing properties such that it emits less odor, it is excellent in low temperature shrinkability and spontaneous shrinkage resistance, and the range of orienting conditions particularly when formed into a shrinkable film can be widened, can be obtained.

Further, it is preferred that the block copolymer (A) or (A2) has a block portion corresponding to a maximum value of the loss tangent value of at 0° C. or below, in order to increase impact resistance of a (multilayer) sheet, (multilayer) film or heat shrinkable (multilayer) film obtained by using the copolymer composition containing the block copolymers (A) and (A2) as essential components.

In the third invention, the amount of the vinyl aromatic hydrocarbon polymers (B1) to (B3) is such that the vinyl aromatic hydrocarbon polymer is at most 100 parts by weight, preferably at most 75 parts by weight, particularly preferably at most 50 parts by weight, based on 100 parts by weight of the copolymer composition comprising (A) and (A2). If it exceeds 100 parts by weight, at least one characteristics of the obtained heat shrinkable (multilayer) film among spontaneous shrinkage resistance, low temperature shrinkability, impact resistance and transparency tends to be impaired.

Now, the composition containing the block copolymer (A) and a block copolymer (A3) according to the fourth invention will be explained.

The composition is a composition comprising the block copolymer (A) having a weight average molecular weight Mw1 within a range of $100,000 \leq Mw1 \leq 300,000$, and a block copolymer (A3) comprising a vinyl aromatic hydrocarbon and a conjugated diene and having a weight average molecular weight Mw2 in relation to Mw1 within a range of $0.1 \leq Mw2/Mw1 \leq 0.85$, wherein the compositional ratio by weight of (A) to (A3) is within a range of $0.1 \leq A/(A+A3) \leq 0.9$.

Further, it may be a copolymer composition which contains at most 100 parts by weight of a vinyl aromatic hydrocarbon polymer containing at least one of the following (B1) to (B3) based on 100 parts by weight of the copolymer composition:

(B1) a vinyl aromatic hydrocarbon polymer, (B2) a block copolymer of a vinyl aromatic hydrocarbon and a conjugated diene (excluding the block copolymer (A)), (B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (a) forms a continuous phase and the rubber-like elastic body (b) forms a disperse phase, and the weight ratio is (a)/(b)=60/40 to 97/3.

The compositional ratio of the vinyl aromatic hydrocarbon and the conjugated diene contained in each of the block copolymers (A) and (A3) is not particularly limited, however, the weight ratio of the conjugated diene is preferably at least 5% and less than 50%, and more preferably within a range of from 7% to 40%. Further, when (A) and (A3) are mixed to obtain a composition, the weight ratio of the conjugated diene based on the entire composition is preferably at least 7% and less than 35%, more preferably at least 12% and less than 25%.

Further, the block copolymer (A3) according to the fourth invention has a weight average molecular weight (Mw2) by gel permeation chromatography (GPC) measurement in relation to the weight average molecular weight Mw1 of the block copolymer (A) within a range of $0.1 \leq Mw2/Mw1 \leq 0.85$, preferably $0.3 \leq Mw2/Mw1 \leq 0.80$, more preferably $0.4 \leq Mw2/Mw1 \leq 0.75$, most preferably $0.5 \leq Mw2/Mw1 \leq 0.72$. If Mw2/Mw1 is less than 0.1, the strength of the obtained film tends to be low, and if it exceeds 0.85, the surface of the obtained oriented film may be wrinkled or surface roughening may occur.

The copolymer composition composed mainly of a block copolymers (A) and (A3) of a vinyl aromatic hydrocarbon and a conjugated diene is preferably such that in the relation of the loss tangent value obtained by dynamic viscoelasticity measurement to the temperature, the loss tangent value has at least one maximum value within a temperature range of from 60 to 110° C., more preferably from 60 to 100° C., furthermore preferably from 75 to 90°C., the value of loss tangent at a temperature lower by 10° C. than the lowest temperature for the maximum value of the loss tangent value within said range, is at most 40% of the highest value, and the value of loss tangent at a temperature lower by 30° C. is at most 10% of the highest value. By such characteristics, favorable spontaneous shrinkage resistance and low temperature shrinkability can be imparted.

In the fourth invention, it is required that the compositional ratio by weight of the block copolymer (A) to the block copolymer (A3) is within a range of $0.1 \leq A/(A+A3) \leq 0.9$, preferably $0.2 \leq A/(A+A3) \leq 0.8$. If the compositional ratio is out of this range, characteristics of each component can not adequately be made use of, and film formation properties tend to decrease, and outer appearance of the sheet or film may be impaired, or shrinkage properties of the oriented film tends to deteriorate in some cases. By mixing such a polymer having a specific molecular weight and having a special relation of the loss tangent value obtained by dynamic viscoelasticity measurement to the temperature, a copolymer composition excellent in processing properties such that it emits less odor, it is excellence in low temperature shrinkability and spontaneous shrinkage resistance, and the range of orienting conditions particularly when formed into a shrinkable film can be widened, can be obtained.

The fifth invention relates to a film, a sheet or a heat shrinkable film made of the block copolymer (A) or a copolymer composition comprising it, and a multilayer film, a multilayer sheet or a heat shrinkable multilayer film employing the block copolymer (A) or a copolymer composition comprising it for at least one layer.

Further, the sixth invention of the present invention relates to a method for producing the block copolymer (A).

BEST MODE FOR CARRYING OUT THE INVENTION

Now, the present invention will further be explained additionally and in detail.

A chemical structure of each of the block copolymers (A), (A2) and (A3) of a vinyl aromatic hydrocarbon and a conjugated diene of the present invention is not particularly limited, and the polymer may have a block copolymer structure wherein the vinyl aromatic hydrocarbon chain and the conjugated diene chain are separated, or the vinyl aromatic hydrocarbon and the conjugated diene may be bonded to each other randomly or with a low rate of change of concentration gradient. Further, it is preferably a block copolymer having a vinyl aromatic chain at least one terminal, particularly preferably at each terminal, so as to achieve favorable heat stability at the time of processing.

The loss tangent value obtained by dynamic viscoelasticity measurement of the present invention is represented as a value of the ratio of loss elasticity modulus obtained as a response when a stress and stain in a tensile direction repeated in a sine wave are imparted to a test material, to the storage elasticity modulus. It means the bound state of molecules in the test specimen, and a high loss tangent value means that molecules are more likely to be loosely bonded, and the heat shrinkable film is more likely to shrink at the temperature. The value obtained by dynamic viscoelasticity varies depending upon the measurement method and conditions, and in the present invention, a sheet having a thickness of from 0.1 to 0.5 mm is subjected to solid viscoelasticity measurement at a measurement temperature within a range of from room temperature to 120° C., at a temperature-raising rate of 4° C./min at a measurement frequency of 1 Hz.

As the vinyl aromatic hydrocarbon used in each of the block copolymers (A), (A2) and (A3) comprising a vinyl aromatic hydrocarbon and a conjugated diene, styrene, o-methylstyrene, p-methylstyrene, p-tert-butylstyrene, 2,4-dimethylstyrene, 2,5-dimethylstyrene, α-methylstyrene, vinyl naphthalene or vinyl anthracene may, for example, be mentioned, and particularly preferably styrene may be mentioned.

Further, the conjugated diene may, for example, be 1,3-butadiene, 2-methyl-1,3-butadiene (isoprene), 2,3-dimethyl-1,3-butadiene, 1,3-pentadiene or 1,3-hexadiene, and particularly preferably 1,3-butadiene or isoprene may be mentioned.

A compositional ratio of the vinyl aromatic hydrocarbon and the conjugated diene in the block copolymer (A) in the present invention is not particularly limited, however, the weight ratio of the conjugated diene is preferably within a range of from 5 to 40%, more preferably from 7 to 30%.

The molecular weight of the block copolymer (A) is not particularly limited also, however, the weight average molecular weight is preferably at least 50,000 and less than 500,000, more preferably at least 100,000 and at most 300,000 as measured by gel permeation chromatography (as calculated as polystyrene). If the weight average molecular weight is less than 50,000, strength of the obtained copolymer tends to be inadequate, and if it exceeds 500,000, a great force will be required when it is processed into a sheet or film, and no favorable product tends to be obtained.

Each of the block copolymers (A), (A2) and (A3) of the present invention can be produced by blending the above explained vinyl aromatic hydrocarbon and conjugated diene, each being of one type or at least two types, and subjecting them to living anionic polymerization employing an organic lithium compound as a polymerization initiator in an organic solvent.

By the living anionic polymerization, polymerization of the vinyl aromatic hydrocarbon and conjugated diene as the material monomers continues so long as a polymerizable active terminal is present, whereby remaining of the monomers can be suppressed. Further, there are such characteristics in view of polymerization reaction that the reactive active terminals are less likely to be deactivated and less likely to be newly formed during the polymerization by a chain transfer reaction. Accordingly, the molecular weight and the molecular structure of the copolymer in the present invention can be controlled depending upon the purpose, by optionally changing the charge amount, the timing of addition and the number of addition of the monomers, the polymerization initiator, the randomizing agent, and the proton donating substance used for deactivation of active terminals (hereinafter referred to as "polymerization terminator").

For example, in a case where a molecular structure of a block type wherein a chain of the vinyl aromatic hydrocarbon and a chain of the conjugated diene are separated is introduced, material chargings of the vinyl aromatic hydrocarbon and the conjugated diene are separately carried out, and after one reaction is completed, the next charging is carried out.

Further, to prepare a chain having a random structure, a randomizing agent which makes the reactivity ratios of the vinyl aromatic hydrocarbon and the conjugated diene same is selected and added, or each of the monomers is added little by little so that the feed weight of each monomer to the reaction system will be always slower than the reaction rate, that is, the reactive terminal of the polymer is always in a starved state.

Further, when the vinyl aromatic hydrocarbon and the conjugated diene are added to the reaction system simultaneously in the presence of a proper randomizing agent, a copolymer having a graded chain structure will be formed.

In the present invention, the randomizing agent is a molecule having polarity, and an amine, an ether, a thioether, and phosphoramide, an alkyl benzene sulfonate, and an alkoxide of potassium or sodium may, for example, be used. As a suitable amine, a tertiary amine such as trimethylamine, triethylamine or tetramethylethylenediamine, or a cyclic tertiary amine may, for example, be used. The ether may, for example, be dimethyl ether, diethyl ether, diphenyl ether, diethylene glycol dimethyl ether, diethylene glycol diethyl ether, diethylene glycol dibutyl ether or tetrahydrofuran. Further, triphenylphosphine, hexamethylphosphoramide, potassium alkyl benzene sulfonate or butoxide of e.g. sodium, potassium or sodium may, for example, be mentioned.

As the randomizing agent, one type or a plural types thereof may be used, and the concentration is suitably from 0.001 to 10 parts by weight in total based on 100 parts by weight of the material monomers.

As the organic solvent, an aliphatic hydrocarbon such as butane, pentane, hexane, isopentane, heptane, octane or isooctane, an alicyclic hydrocarbon such as cyclopentane, methylcyclopentane, cyclohexane, methylclohexane or ethylcyclohexane, or an aromatic hydrocarbon such as benzene, toluene, ethylbenzene or xylene, may, for example, be used.

The organic lithium compound as the polymerization initiator is a compound having at least one lithium atom bonded in its molecule, and in the present invention, a monofunctional polymerization initiator such as ethyl lithium, n-propyl lithium, isopropyl lithium, n-butyllithium, sec-butyllithium or tert-butyllithium, or a multifunctional polymerization initiator such as hexamethylene dilithium, butadienyl dilithium or isoprenyl dilithium may, for example, be used.

As the polymerization terminator in the living anionic polymerization in the present invention, at least one member selected from water, an alcohol, an inorganic acid, an organic acid and a phenol compound is added to the reaction system to terminate the polymerization.

As the polymerization terminator, water is particularly preferred.

The alcohol as the polymerization terminator may, for example, be methanol, ethanol or butanol, the inorganic acid may, for example, be hydrochloric acid, sulfuric acid, nitric acid, boric acid, phosphoric acid or carbonic acid, the organic acid may, for example, be a carboxylic acid such as octylic acid, capric acid, lauric acid, myristic acid, palmitic acid, stearic acid, olefinic acid, linoleic acid, linolenic acid, ricinoleic acid or behenic acid, or sulfonic acid or sulfinic acid, and the phenol compound may, for example, be 2-[1-(2-hydroxy-3,5-di-tert-pentylphenyl)ethyl]-4,6-di-tert-pentylphenylacrylate, 2-tert-butyl-6-(3-tert-butyl-2-hydroxy-5-methylbenzyl)-4-methylphenyl acrylate or octadecyl-3-(3,5-di-tert-butyl-4-hydroxyphenyl)propionate.

The number of deactivation at the polymerizable active terminals is in proportion to the stoichiometric amount of the polymerization terminator added, and accordingly the polymerization terminator may be added in a stoichiometric amount smaller than the number of active terminals dividedly in several times, so that only a part of active terminals during the polymerization are deactivated, and while polymerization is further continued by the remaining active terminals, and the remaining active terminals is deactivated when a predetermined rate of polymerization is achieved, or the entire active terminals may be deactivated all at once. However, it is necessary to deactivate all the active terminals by adding an adequate amount of the polymerization terminator relative to the number of active terminals at that point at the completion of the polymerization.

As a method to separate the copolymer solution after completion of the deactivation treatment from the solvent, (1) a method of precipitating it in a poor solvent such as methanol, (2) a method of supplying the copolymer solution to e.g. a heated roll, and evaporating the solvent alone to separate the copolymer (drum drier method), (3) a method of supplying the heated block copolymer (composition) solution to a can maintained to a pressure lower than the equilibrium vapor pressure at the temperature of the organic solvent contained in the heated solution continuously or intermittently for devolatilization (flush evaporation method), (4) a method of passing the copolymer solution through a vent type extruder for devolatilization, (5) a method of injecting the copolymer solution into warm water with stirring to evaporate the solvent (steam stripping method), or a combination thereof may be mentioned.

In the present invention, of the block copolymer (A) and/or the copolymer composition containing the block copolymer (A) as an essential component, in the relation of the loss tangent value obtained by dynamic viscoelasticity measurement to the temperature, there is at least one maximum value within a temperature range of from 60 to 110° C., preferably from 62 to 105° C., particularly preferably from 65 to 100° C., the highest maximum value within this range is preferably from 0.5 to 4.0, particularly preferably from 0.7 to 3.5, the value of loss tangent at a temperature lower by 10° C. than the lowest temperature for the maximum value is at most 40%, preferably at most 35% of the highest maximum value, the value of loss tangent at a temperature lower by 30° C. than the lowest temperature is at most 10%, preferably at most 8% of the highest maximum value, and further, the loss tangent value at 30° C. is preferably from 0.01 to 0.4, particularly preferably from 0.01 to 0.2. In other words, the present inventors have found that a heat shrinkable (multilayer) film having favorable spontaneous shrinkage resistance can be obtained without impairing the low temperature shrinkability, by using the block copolymer (A) and/or the copolymer composition containing the block copolymer (A) as an essential component, having a steep maximum value having a high peak shape of the loss tangent value within a temperature range of from 60 to 110° C.

In the present invention, of the block copolymer (A) and/or the copolymer composition containing the block copolymer (A) as an essential component, in the relation of the loss tangent value obtained by dynamic viscoelasticity measurement to the temperature, if there is no maximum value within a temperature range of from 60 to 110° C., and the temperature for the maximum value exceeds 110° C., the low temperature shrinkability of the obtained heat shrinkable (multilayer) film tends to be inadequate, and if there is no maximum value within a temperature range of from 60 to 110° C., and the temperature for the maximum value is less than 60° C., the spontaneous shrinkage resistance may be inadequate in some cases. Further, if the value of loss tangent at a temperature lower by 10° C. than the lowest temperature for the maximum value exceeds 40% of the highest maximum value, the value of loss tangent at a temperature lower by 30° C. than the lowest temperature exceeds 10% of the highest maximum value, or the loss tangent value at 30° C. exceeds 0.4, the spontaneous shrinkage resistance tends to be impaired.

Now, the method for producing the block copolymer (A), the loss tangent value of which satisfies the conditions (1) to (3) as defined in claim 1 will be explained in further detail below.

In order that the temperature for the maximum value of the loss tangent value is from 60 to 110° C., it is desirable that a copolymer segment portion having a weight ratio of the vinyl aromatic hydrocarbon to the conjugated diene of from 98/2 to 72/28, preferably from 97/3 to 75/25, particularly preferably from 95/5 to 80/20, is contained in the block copolymer. Needless to say, the temperature for the maximum value of the loss tangent value may be set to a high temperature of from 70 to 110° C. when α-methylstyrene instead of styrene as the vinyl aromatic hydrocarbon or isoprene instead of butadiene as the conjugated diene is used with a high proportion, or the proportion of vinyl bonds in a microstructure of butadiene is increased. However, if the vinyl bonds increase, if it stays at the time of processing, gel tends to form, and in view of material cost, styrene and butadiene are most preferred as the vinyl aromatic hydrocarbon and as the conjugated diene, respectively, and the proportion of the vinyl bonds is preferably at most 20%, particularly preferably at most 16%, in the microstructure of butadiene, and in such a case, the temperature for the maximum value of the loss tangent value is likely to be controlled to a low temperature of from 60 to 110° C.

If the weight ratio of the vinyl aromatic hydrocarbon to the conjugated diene in the segment portion of the copolymer chain of the vinyl aromatic hydrocarbon and the conjugated diene corresponding to a temperature for the maximum value of the loss tangent value of from 60 to 110° C. exceeds 98/2, the low temperature shrinkability of the obtained heat shrinkable film tends to decrease, on the other hand, if it is less than 72/28, the maximum value of the loss tangent value tends to be less than 60° C., and the spontaneous shrinkage resistance tends to decrease.

In order to obtain a steep peak which satisfies the conditions (2) and (3) among the above conditions for the loss tangent value, it is preferred that the segment portion of the copolymer chain of the vinyl aromatic hydrocarbon and the conjugated diene corresponding to the maximum value of the loss tangent value within a temperature range of from 60 to 110° C., is polymerized under such conditions that the proportion of the random chain of the vinyl aromatic hydrocarbon and the conjugated diene is high. For example, a method of adding them in small amounts so that the reactive terminals in each monomer polymerization are always in a substantially starved state, or a method of copolymerizing them in the presence of a randomizing agent may be mentioned.

Further, the peak shape of the maximum value of the loss tangent value tends to be broad or the temperature for the maximum value tends to slightly change, under influence of the segment portion adjacent to the segment portion of the copolymer chain of the vinyl aromatic hydrocarbon and the conjugated diene corresponding to a temperature for the maximum value of the loss tangent value of from 60 to 110° C. Thus, preferred is a block copolymer comprising from 0.1 to 50 parts by weight, preferably from 0.2 to 30 parts by weight, particularly preferably from 1 to 15 parts by weight, of the adjacent segment portion comprising a vinyl aromatic hydrocarbon and/or a conjugated diene based on 100 parts by weight of the segment portion of the copolymer chain of the vinyl aromatic hydrocarbon and the conjugated diene corresponding to a temperature for the maximum value of the loss tangent value of from 60 to 110° C. Further, in view of effect of improving heat stability at the time of processing, the segment portion comprising a vinyl aromatic hydrocarbon alone is present on one terminal, particularly on both terminals. For example, in a case of a block copolymer having a segment comprising a vinyl aromatic hydrocarbon alone on one terminal, particularly on both terminals, even if e.g. the edge or the like obtained at the time of extruding or orienting the heat shrinkable (multilayer) film is mixed as a returned material, a sheet or film having favorable orienting processability, low temperature shrinkability, spontaneous shrinkage resistance and transparency can be obtained.

The block copolymer (A) of the present invention may be produced, for example, by the following method taking the above into consideration. However, its production is not limited to the following method.

A method for producing a block copolymer, which comprises polymerizing from 0 to 50 parts by weight of a vinyl aromatic hydrocarbon and/or a conjugated diene as a monomer employing an organic lithium compound as an initiator in an organic solvent (first step), adding 100 parts by weight in total of a vinyl aromatic hydrocarbon and a conjugated diene in a weight ratio of the vinyl aromatic hydrocarbon to the conjugated diene of from 98/2 to 72/28, as mixed or separately, simultaneously, and intermittently or continuously to the reaction system so that the feed rate of the monomers is substantially lower than the reaction rate (second step), and polymerizing from 0.1 to 50 parts by weight of a vinyl aromatic hydrocarbon and/or a conjugated diene as a monomer (third step).

Further, a method for producing a block copolymer may be mentioned, which comprises polymerizing from 0 to 50 parts by weight of a vinyl aromatic hydrocarbon and/or a conjugated diene as a monomer employing an organic lithium compound as an initiator in an organic solvent (first step), adding 100 parts by weight in total of a vinyl aromatic hydrocarbon and a conjugated diene with a weight ratio of the vinyl aromatic hydrocarbon to the conjugated diene of from 98/2 to 72/28 as mixed or separately to the reaction system in the presence of a randomizing agent for polymerization (second step), and polymerizing from 0.1 to 50 parts by weight of a vinyl aromatic hydrocarbon and/or a conjugated diene as a monomer (third step).

The first step is not necessarily required, but the method is characterized by the polymerization steps of the second and third steps. Each of the first and third steps is not necessarily a single step, and it may be a step of obtaining a block copolymer having at least two segments. For example, the segment portion obtained in the first step may comprise a vinyl aromatic hydrocarbon chain alone, but in the third step, a segment portion of a vinyl aromatic hydrocarbon chain and a segment portion of a conjugated diene chain may be obtained.

The block copolymer (A) as an essential component in the present invention is not particularly limited so long as conditions for the measured values obtained by dynamic viscoelasticity measurement as defined in claims are satisfied. Further, it may be a blended product of the block copolymer (A) with another block copolymer. For example, so long as the main component of the block copolymer (A) is a block copolymer having the above-described random structure segment, the vinyl aromatic hydrocarbon and the conjugated diene may be bonded with a low rate of change of concentration gradient (graded structure) in the other block copolymer, and there is not necessarily a maximum value of the loss tangent value within a range of from 60 to 110° C. For example, in a case where a heat shrinkable (multilayer) film having favorable impact resistance is required, another block copolymer which shows a temperature for the maximum value of the loss tangent value of at most 0° C., not from 60 to 110° C., may be used together.

Further, with the block copolymer (A) of the present invention thus produced, a vinyl aromatic hydrocarbon polymer containing at least one member selected from the following polymers (B1) to (B3) may be mixed as the case requires. In such a case also, the loss tangent valve preferably satisfies the conditions (1) to (3) as identified in claim 1 from the viewpoint of the low temperature shrinkability and spontaneous shrinkage resistance:

(B1) a vinyl aromatic hydrocarbon polymer,
(B2) a block copolymer of a vinyl aromatic hydrocarbon and a conjugated diene (excluding the block copolymer (A)),
(B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (a) forms a continuous phase and the rubber-like elastic body (b) forms a disperse phase, and the weight ratio is (a)/(b)=60/40 to 97/3.

Now, the polymers (B1) to (B3) will be explained below.

The vinyl aromatic hydrocarbon polymer (B1) may be polyethylene, a vinyl aromatic hydrocarbon/(meth)acrylate and/or (meth)acrylic acid copolymer, or a high-impact polystyrene. For example, polystyrene may be used together in order to increase the rigidity of the obtained film, a high-impact polystyrene may be used together with a purpose of improving blocking properties, and a vinyl aromatic hydrocarbon/(meth)acrylate and/or (meth)acrylic acid copolymer may be used together to improve processability and low temperature orienting properties.

The vinyl aromatic hydrocarbon used for the vinyl aromatic hydrocarbon polymer (B1) in the present invention may be the vinyl aromatic hydrocarbon as exemplified for the block copolymer (A). Further, the (meth)acrylate monomer may, for example, be methyl methacrylate, ethyl methacrylate, methyl acrylate, ethyl acrylate, n-butyl acrylate, 2-methylhexyl acrylate, 2-ethylhexyl acrylate or octyl acrylate, and the (meth)acrylic acid monomer may be acrylic acid or methacrylic acid. Preferred is methyl methacrylate or n-butyl acrylate. Needless to say, at least two types of (meth)acrylate monomer and/or (meth)acrylic acid monomer such as at least two types of methyl methacrylate and n-butyl acrylate, may be used together.

As the vinyl aromatic hydrocarbon and the conjugated diene to be used for the block copolymer of a vinyl aromatic hydrocarbon and a conjugated diene (B2), the monomers to be used for production of the block copolymer (A) may be used and are not particularly limited.

Regarding (B3), the monomer to be used for the copolymer (a) comprising a vinyl aromatic hydrocarbon and a (meth)acrylate and having a refractive index of from 1.550 to 1.580 at a temperature of 23° C., may be one as exemplified for the vinyl aromatic hydrocarbon polymer (B1), and the refractive index may be adjusted by the type of the monomer and composition. If the refractive index of the copolymer comprising a vinyl aromatic hydrocarbon and a (meth)acrylate is less than 1.550, decrease in transparency tends to be significant when blended with the block copolymer (A) or polystyrene, and if it exceeds 1.580, decrease in transparency tends to be significant when blended with the rubber-like elastic body. Further, as the rubber-like elastic body (b), the block copolymer comprising a vinyl aromatic hydrocarbon and a conjugated diene, a MBS resin or a MBAS resin may be mentioned. Such a rubber-like elastic body may be used alone or as mixed, and the refractive index of the rubber-like elastic body is preferably within a range of from 1.535 to 1.550 so as to keep transparency. By controlling the refractive indices of the copolymer (a) and the rubber-like elastic body (b) within the above ranges, respectively, it is effective to keep transparency when e.g. the edge of a multilayer sheet, a multilayer film or a heat shrinkable multilayer film obtained at the time of extruding/orienting is mixed as a returned material in an amount of at most 50 parts by weight based on 100 parts by weight of the block copolymer (A) or the copolymer composition and/or the vinyl aromatic hydrocarbon polymer (B1) to (B3).

The weight ratio of the copolymer (a) to the rubber-like elastic body (b) is (a)/(b)=60/40 to 97/3, preferably 70/30 to 95/5, more preferably 75/25 to 91/9. If the weight ratio of (a)/(b) is less than 60/40, rigidity tends to be poor, and if it exceeds 97/3, the impact strength tends to be inadequate.

As a method for producing the rubber-modified transparent resin (B3), a method of blending the copolymer (a) with at least one rubber-like elastic body (b) selected from a MBS resin and a MBAS resin obtained by e.g. emulsion polymerization, and a block copolymer comprising a vinyl aromatic hydrocarbon and a conjugated diene obtained by e.g. anionic polymerization, or a method of polymerizing a monomer mixture corresponding to the copolymer (a) by e.g. emulsion polymerization, bulk-suspension polymerization or bulk polymerization in the presence of a random copolymer comprising polybutadiene, a vinyl aromatic hydrocarbon and a conjugated diene or a block copolymer comprising a vinyl aromatic hydrocarbon and a conjugated diene, may be mentioned.

In the present invention, the amount of the vinyl aromatic hydrocarbon polymer (B1) to (B3) is preferably at most 100 parts by weight based on 100 parts by weight of the block copolymer (A) and/or its copolymer composition. If it exceeds 100 parts by weight, it tends to be difficult to satisfy both spontaneous shrinkage resistance and low temperature shrinkability of the obtained heat shrinkable (multilayer) film, or a impact resistance tends to be impaired.

Further, in a case where the vinyl aromatic hydrocarbon polymer (B1) is an opaque high-impact polystyrene, its amount is at most 20 parts by weight, preferably at most 10 parts by weight, particularly preferably at most 5 parts by weight. If it exceeds 20 parts by weight, transparency tends to decrease.

For mixing, melt kneading by means of e.g. an extruder is preferred. Further, formation into a sheet or a film by melt kneading by means of e.g. a sheet extruder or a film extruder is also one of preferred examples.

Into the block copolymer (A) and/or its copolymer composition obtained in the present invention, various additives may further be incorporated as the case requires.

In a case where the block copolymer composition is subjected to various heat treatments, in order to handle deterioration of physical properties when its molded product or the like is used in an oxidizing atmosphere or under irradiation with e.g. ultraviolet rays, or in order to further impart physical properties suitable for the purpose of use, an additive such as a stabilizer, a lubricant, a processing aid, an anti-blocking agent, an antistatic agent, an anti-fogging agent, a weather resistance-improving agent, a softening agent, a plasticizer or a pigment may, for example, be added.

The stabilizer may, for example, be 2-[1-(2-hydroxy-3,5-di-tert-pentylphenyl)ethyl]-4,6-di-tert-pentylphenylacrylate or 2-tert-butyl-6-(3-tert-butyl-2-hydroxy-5-methylbenzyl)-4-methylphenyl acrylate, a phenol type antioxidant such as octadecyl-3-(3,5-di-tert-butyl-4-hydroxyphenyl)propionate or 2,6-di-tert-butyl-4-methylphenol, or a phosphorus type antioxidant such as 2,2-methylenebis(4,6-di-tert-butylphenyl)octylphosphite, trisnonylphenylphosphite or bis(2,6-di-tert-butyl-4-methylphenyl)pentaerythritol-diphosphite.

Further, the lubricant, processing aid, anti-blocking agent, antistatic agent or anti-fogging agent may, for example, be a saturated fatty acid such as palmitic acid, stearic acid or behenic acid, a fatty acid ester or a pentaerythritol fatty acid ester such as octyl palmitate or octyl stearate, a fatty acid amide such as erucamide, oleamide or stearamide, ethylenebis stearamide, a glycerol-mono-fatty acid ester, a glycerol-di-fatty acid ester, or a sorbitan fatty acid ester such as sorbitan-mono-palmitate or sorbitan-mono-stearate, or a higher alcohol represented by myristyl alcohol, cetyl alcohol or stearyl alcohol.

The weather resistance-improving agent may, for example, be a benzotriazole type such as 2-(2'-hydroxy-3'-tert-butyl-5'-methylphenyl)-5-chlorobenzotriazole, a salicylate type such as 2,4-di-tert-butylphenyl-3',5'-di-tert-butyl-4'-hydroxybenzoate, a benzophenone type ultraviolet absorber such as 2-hydroxy-4-n-octoxybenzophenone, or a hindered amine type weather resistance-improving agent such as tetrakis(2,2,6,6-tetramethyl-4-piperidyl)-1,2,3,4-butanetetracarboxylate. Further, white oil or silicone oil may, for example, be added.

Such an additive is used preferably in an amount of at most 5 parts by weight based on 100 parts by weight of the block copolymer composition.

The block copolymer or the copolymer composition of the present invention is processed into various molded products by a known method such as injection molding, extrusion, compression molding or vacuum molding and used practically. It is preferably used in the form of a sheet or a film, and it is more preferably used as a heat shrinkable film or a heat shrinkable multilayer film.

The single-layer sheet and/or the single-layer film of the present invention are made of the block copolymer (A) and/or its copolymer composition which satisfies the conditions of the loss tangent value, and the single-layer heat shrinkable film can be obtained by orienting the single-layer sheet and/or the single-layer film, by tubular orienting or the like.

As examples of the multilayer film, the multilayer sheet and the heat shrinkable multilayer film of the present invention, a multilayer film, a multilayer sheet and a heat shrinkable multilayer film, having a surface layer (surface and/or rear layer) formed by a copolymer component composed mainly of the block copolymer (A) of the present invention or a copolymer composition containing (A) as an essential component and a layer other than the surface layer (intermediate layer or primary coat) formed by the component (B1) to (B3) and/or a block copolymer comprising a vinyl aromatic hydrocarbon and a conjugated diene, and on the contrary, a multilayer film, a multilayer sheet and a heat shrinkable multilayer film having a surface layer formed by the component (B1) to (B3) and/or a block copolymer comprising a vinyl aromatic hydrocarbon and a conjugated diene, and a layer other than the surface layer formed by a copolymer component composed mainly of the block copolymer (A) of the present invention or a copolymer composition containing (A) as an essential component, may be mentioned.

As the method for producing the heat shrinkable film and the heat shrinkable multilayer film, a known method may be employed. For example, the heat shrinkable film may be obtained by melting a resin in an extruder, extruding it by means of a die such as a T-die or a ring die to form it into a film, and orienting the film uniaxially, biaxially or multi-axially. Further, the heat shrinkable multilayer film may be obtained by laminating separately melted resins in a die, by means of a feed block or the like and then extruding the layer into a film, and orienting the film uniaxially, biaxially or multi-axially.

In the present invention, the orienting temperature is preferably from 60 to 120° C. If it is less than 60° C., the sheet or the film is likely to break at the time of orienting, and if it exceeds 120° C., no favorable shrinkability will be obtained. The orienting ratio is not particularly limited, but is preferably from 1.5 to 8 times. If it is 1.5 times, the heat shrinkability tends to be inadequate, and if it exceeds 8 times, orienting tends to be difficult. When such a film is used as a heat shrinkable label or a packaging material, the heat shrinkage factor is at least 15% at 80° C., preferably at least 15% at 70° C., particularly preferably at least 20% at 70° C., in view of rapid shrinkage at a low temperature. The thickness of the film is preferably from 10 to 300 $\mu$m, more preferably from 20 to 100 $\mu$m.

The copolymer mixture forming the multilayer film or the multilayer sheet of the present invention may, for example, be the multilayer film, the multilayer sheet or the heat shrinkable multilayer film, or the edge generated when such a film is subjected to e.g. extrusion or orienting, or a pulverized product or a re-pelletized product (returned material) thereof. The amount of the copolymer mixture forming the multilayer film or the multilayer sheet is preferably at most 50 parts by weight based on 100 parts by weight of the block copolymer (A) which satisfies the conditions of the loss tangent value or its copolymer composition and/or the vinyl aromatic hydrocarbon copolymer (B1) to (B3). If it exceeds 50 parts by weight, decrease in transparency, impact resistance or the like of the obtained heat shrinkable multilayer film tends to be significant.

Further, in the present invention, an antistatic agent or a lubricant may be coated on the surface so as to improve the surface properties of the obtained film.

As the application of the heat shrinkable film or the thermoplastic multilayer film of the present invention, a heat shrinkable label, a heat shrinkable cap seal, a protective film for bottles, a pack guard shrink packaging, or an electrical insulating coating for e.g. capacitors and dry batteries are particularly preferred, and further, it may be optionally used for a packaging film, a cap material and the like.

Now, the present invention will be explained in further detail with reference to Examples. However, it should be understood that the present invention is by no means restricted to the following Examples.

Methods for producing a block copolymer (composition) and the like used in Examples will be described below as Reference Examples.

REFERENCE EXAMPLE 1

(1) 490 kg of cyclohexane as a polymerization solvent was charged into a reactor and maintained at 80° C. In the following Examples and Comparative Examples, cyclohexane was employed as the polymerization solvent.

(2) 1,300 mL of a 10 wt % cyclohexane solution of n-butyllithium as a polymerization catalyst solution was preliminarily added thereto, and 10.5 kg of a styrene monomer was charged thereto all at once, which was subjected to anionic polymerization. In the following Examples and Comparative Examples, a 10 wt % cyclohexane solution of n-butyllithium was employed as the polymerization catalyst solution.

(3) After the rate of polymerization of the styrene monomer exceeded 99%, while heating the internal temperature of the reaction system at 80° C., a styrene monomer in a total amount of 170.1 kg and butadiene in a total amount of 18.9 kg were simultaneously added at constant addition rates of 76.5 kg/h and 8.5 kg/h, respectively, and the state was kept as it was for 5 minutes after completion of the addition.

(4) 10.5 kg of a styrene monomer was further added all at once to complete the polymerization.

(5) Finally, all the polymerizable active terminals were deactivated with water to obtain a polymer liquid containing a polymer having a weight average molecular weight (as calculated as polystyrene by GPC, the same applies hereinafter) of 186,000 and having a polystyrene block portion and a random structure portion of styrene and butadiene.

REFERENCE EXAMPLE 2

(1) Into a reactor, 490 kg of the polymerization solvent and 7.4 kg of a styrene monomer were charged and maintained at 30° C.

(2) 1,100 mL of the polymerization catalyst solution was added thereto, and the styrene monomer was subjected to anionic polymerization.

(3) After the styrene monomer was completely consumed, while maintaining the internal temperature of the reaction system at 50° C., 6.3 kg of butadiene was added thereto all at once, and it was successively reacted.

(4) After the butadiene gas was completely consumed, while maintaining the internal temperature of the reaction system at 80° C., a styrene monomer in a total amount of 173.7 kg and butadiene in a total amount of 15.1 kg were simultaneously added thereto at constant addition rates of 97.7 kg/h and 8.5 kg/h, respectively, and the state was kept as it was for 5 minutes after completion of the addition.

(5) Further, 7.4 kg of a styrene monomer was added all at once to complete the polymerization.

(6) Finally, all the polymerizable active terminals were deactivated with water to obtain a polymer liquid containing a polymer having a molecular weight of 214,000 and having a polystyrene block portion, a block portion of polybutadiene and a random structure portion of styrene and butadiene.

REFERENCE EXAMPLE 3

(1) Into a reactor, 490 kg of the polymerization solvent and 84.0 kg of a styrene monomer were charged and maintained at 30° C.

(2) 1,700 mL of the polymerization catalyst solution was added thereto, and the styrene monomer was subjected to anionic polymerization.

(3) After the rate of polymerization of the styrene monomer exceeded 99%, while maintaining the internal temperature of the reaction system at 50° C., 42 kg of butadiene was added thereto all at once, and it was successively reacted.

(4) After the rate of polymerization of the butadiene monomer exceeded 99%, after the gas was completely consumed, while maintaining the internal temperature of the reaction system at 50° C., 84.0 kg of a styrene monomer was added to complete the polymerization.

(5) Finally, all the polymerizable active terminals were deactivated with water to obtain a polymer liquid containing a polymer having a weight average molecular weight of 149,000 and having a polystyrene block portion and a block portion of polybutadiene.

REFERENCE EXAMPLE 4

(1) Into a reactor, 357 kg of the polymerization solvent was charged and maintained at 80° C.

(2) 800 mL of the polymerization catalyst solution was preliminary added thereto, and 5.4 kg of a styrene monomer was charged thereinto all at once and subjected to anionic polymerization.

(3) After the rate of polymerization of the styrene monomer exceeded 99%, while maintaining the internal temperature of the reaction system at 80° C., a styrene monomer in a total amount of 130.9 kg and butadiene in a total amount of 11.4 kg were simultaneously added thereto at constant addition rates of 97.6 kg/h and 8.5 kg/h, respectively, and the state was kept as it was for 5 minutes after completion of the addition.

(4) Further, 5.4 kg of a styrene monomer was added thereto all at once to complete the polymerization.

(5) Finally, all the polymerizable active terminals were deactivated with water to obtain a polymer liquid containing a polymer having a weight average molecular weight of 205,000 and having a polystyrene block portion and a random structure portion of styrene and butadiene.

REFERENCE EXAMPLE 5

(1) Into a reactor, 490 kg of the polymerization solvent and 6.3 kg of a styrene monomer were charged and maintained at 30° C.

(2) 1,620 mL of the polymerization catalyst solution was added thereto, and the styrene monomer was subjected to anionic polymerization.

(3) After the styrene monomer was completely consumed, while maintaining the internal temperature of the reaction system at 50° C., 31.5 kg of butadiene was added thereto all at once, and it was successively reacted.

(4) After the butadiene gas was completely consumed, while maintaining the internal temperature of the reaction system at 80° C., a styrene monomer in a total amount of 152.7 kg and butadiene in a total amount of 13.2 kg were simultaneously added thereto at constant addition rates of 98.3 kg/h and 8.5 kg/h, respectively, and the state was kept as it was for 5 minutes after completion of the addition.

(5) Further, 6.3 kg of a styrene monomer was added all at once to complete the polymerization.

(6) Finally, all the polymerizable active terminals were deactivated with water to obtain a polymer liquid containing a polymer having a molecular weight of 146,000 and having a polystyrene block portion, a block portion of polybutadiene and a random structure portion of styrene and butadiene.

REFERENCE EXAMPLE 6

(1) Into a reactor, 490 kg of the polymerization solvent and 6.3 kg of a styrene monomer were charged and maintained at 30° C.

(2) 1,600 mL of the polymerization catalyst solution was added thereto, and the styrene monomer was subjected to anionic polymerization.

(3) After the styrene monomer was completely consumed, while maintaining the internal temperature of the reaction system at 80° C., a styrene monomer in a total amount of 2.6 kg and butadiene in a total amount of 22.7 kg were simultaneously added at constant addition rates of 8.0 kg/h and 72 kg/h, respectively, and the state was kept as it was for 5 minutes after completion of the addition.

(4) After the styrene monomer and the butadiene gas were completely consumed, while maintaining the internal temperature of the reaction system at 80° C., a styrene monomer in a total amount of 158.4 kg and butadiene in a total amount of 13.7 kg were simultaneously added thereto at constant addition rates of 98.3 kg/h and 8.5 kg/h, respectively, and the state was kept as it was for 5 minutes after completion of the addition.

(5) Further, 6.3 kg of a styrene monomer was added all at once to complete the polymerization.

(6) Finally, all the polymerizable active terminals were deactivated with water to obtain a polymer liquid containing a polymer having a molecular weight of 152,000 and having a polystyrene block portion and two types of structure portions having different concentration proportion of styrene and butadiene.

REFERENCE EXAMPLE 7

(1) Into a reactor, 490 kg of the polymerization solvent and 5.3 kg of a styrene monomer were charged and maintained at 30° C.

(2) 1,620 mL of the polymerization catalyst solution was added thereto, and the styrene monomer was subjected to anionic polymerization.

(3) After the styrene monomer was completely consumed, while maintaining the internal temperature of the reaction system at 50° C., 21.0 kg of butadiene was added thereto all at once, and it was successively reacted.

(4) After the butadiene gas was completely consumed, while maintaining the internal temperature of the reaction system at 80° C., a styrene monomer in a total amount of 155.4 kg and butadiene in a total amount of 23.1 kg were simultaneously added thereto at constant addition rates of 57.6 kg/h and 8.5 kg/h, respectively, and the state was kept as it was for 5 minutes after completion of the addition.

(5) After the internal temperature was lowered to 50° C., 5.3 kg of a styrene monomer was further added thereto all at once to complete the polymerization.

(6) Then, all the polymerizable active terminals were deactivated with water to obtain a polymer having a molecular weight of 155,000 and having a polystyrene block portion, a block portion of polybutadiene and a random structure portion of styrene and butadiene, as a polymer liquid A.

(7) The same operation as for preparation of the polymer liquid A was carried out except that the amount of the polymerization catalyst solution was 1,240 mL to obtain a polymer liquid B having the same molecular structure and having a molecular weight of 218,000.

(8) 200 Parts by weight of the polymer liquid B was mixed with 100 parts by weight of the above-described polymer liquid A, followed by devolatilization to obtain an intended polymer.

REFERENCE EXAMPLE 8

(1) Into a reactor, 525 kg of the polymerization solvent and 56.5 kg of a styrene monomer were charged and maintained at 30° C.

(2) 1,700 mL of the polymerization catalyst solution was added thereto, and the styrene monomer was subjected to anionic polymerization.

(3) After the styrene monomer was completely consumed, while maintaining the internal temperature of the reaction system at 30° C., 16.9 kg of butadiene was added thereto all at once, and it was successively reacted.

(4) After the butadiene gas was completely consumed, while maintaining the internal temperature of the reaction system at 80° C., a styrene monomer in a total amount of 78.3 kg and butadiene in a total amount of 16.9 kg were simultaneously added thereto at constant addition rates of 77.1 kg/h and 16.6 kg/h, respectively, and the state was kept as it was for 10 minutes after completion of the addition.

(5) After the internal temperature was lowered to 50° C., 56.5 kg of a styrene monomer was further added thereto all at once to complete the polymerization.

(6) Finally, all the polymerizable active terminals were deactivated with water to obtain a polymer liquid containing a polymer having a molecular weight of 178,000 and having a polystyrene block portion, a block portion of polybutadiene and a random structure portion of styrene and butadiene.

REFERENCE EXAMPLE 9

(1) Into a reactor, 385 kg of the polymerization solvent and 57.8 kg of a styrene monomer were charged and maintained at 30° C.

(2) 1,700 mL of the polymerization catalyst solution was added thereto, and the styrene monomer was subjected to anionic polymerization.

(3) After the styrene monomer was completely consumed, while maintaining the internal temperature of the reaction system at 45° C., 49.5 kg of butadiene was added thereto all at once, and it was successively reacted.

(4) After the butadiene gas was completely consumed, while maintaining the internal temperature of the reaction system at 60° C., 57.8 kg of a styrene monomer was added thereto to complete the polymerization.

(5) Finally, all the polymerizable active terminals were deactivated with water to obtain a polymer liquid containing a polymer having a molecular weight of 118,000 and having a polystyrene block portion and a block portion of polybutadiene.

REFERENCE EXAMPLE 10

(1) Into a reactor, 490 kg of the polymerization solvent, 16.0 kg of α-methylstyrene and 68.0 kg of a styrene monomer were charged and maintained at 40° C.

(2) 1,500 mL of the polymerization catalyst solution was added thereto, and the vinyl aromatics monomers were subjected to anionic polymerization.

(3) After the vinyl aromatic monomers were completely consumed, while maintaining the internal temperature of the reaction system at 50° C., 4.2 kg of butadiene was added thereto all at once, and it was successively reacted.

(4) After the butadiene gas was completely consumed, while maintaining the internal temperature of the reaction system at 50° C., 16.0 kg of α-methylstyrene and 68.0 kg of a styrene monomer were added thereto and polymerized.

(5) Finally, all the polymerizable active terminals were deactivated with water to obtain a polymer liquid containing a polymer having a molecular weight of 143,000 and having a polyvinyl aromatic block portion and a block portion of polybutadiene.

REFERENCE EXAMPLE 11

(1) Into a reactor, 245 kg of the polymerization solvent and 3.6 kg of a styrene monomer were charged and maintained at 30° C.

(2) 600 mL of the polymerization catalyst solution was added thereto, and the styrene monomer was subjected to anionic polymerization.

(3) After the styrene monomer was completely consumed, while maintaining the internal temperature of the reaction system at 40° C., 8.3 kg of butadiene was added thereto all at once, and it was successively reacted.

(4) After butadiene and the styrene monomer were completely consumed, while maintaining the internal temperature of the reaction system at 80° C., successively a styrene monomer in a total amount of 50.1 kg and butadiene in a total amount of 20.6 kg were simultaneously added thereto at constant addition rates of 57.7 kg/h and 23.7 kg/h, respectively, and the state was kept as it was for 5 minutes after completion of the addition.

(5) After the internal temperature was lowered to 50° C., 3.6 kg of a styrene monomer was further added thereto all at once to complete the polymerization.

(6) Finally, all the polymerizable active terminals were deactivated with water to obtain a polymer liquid containing a polymer having weight average a molecular weight of 182,000 and having a polystyrene block portion, a block portion of polybutadiene and a random structure portion of styrene and butadiene.

REFERENCE EXAMPLE 12

(1) Into a reactor, 490 kg of the polymerization solvent and 7.4 kg of a styrene monomer were charged and maintained at 30° C.

(2) 1,100 mL of the polymerization catalyst solution was added thereto, and the styrene monomer was subjected to anionic polymerization.

(3) After the rate of polymerization of the styrene monomer exceeded 99%, while maintaining the internal temperature of the reaction system at 50° C., 6.3 kg of butadiene was added thereto all at once, and it was successively reacted.

(4) After the rate of polymerization of the butadiene monomer exceeded 99%, while maintaining the internal temperature of the reaction system at 80° C., a styrene monomer in a total amount of 160.5 kg and butadiene in a total amount of 28.3 kg were simultaneously added thereto at constant addition rates of 53.5 kg/h and 9.4 kg/h, respectively, and the state was kept as it was for 5 minutes after completion of the addition.

(5) Further, 7.4 kg of a styrene monomer was added thereto all at once to complete the polymerization.

(6) Finally, all the polymerizable active terminals were deactivated with water to obtain a polymer liquid containing a polymer having a weight average molecular weight of 214,000 and having a polystyrene block portion, a block portion of polybutadiene and a random structure portion of styrene and butadiene.

REFERENCE EXAMPLE 13

(1) Into a reactor, 490 kg of the polymerization solvent and 6.3 kg of a styrene monomer were charged and maintained at 30° C.

(2) 1,620 mL of the polymerization catalyst solution was added thereto, and the styrene monomer was subjected to anionic polymerization.

(3) After the rate of polymerization of the styrene monomer exceeded 99%, while maintaining the internal temperature of the reaction system at 80° C., a styrene monomer in a total amount of 189.2 kg and butadiene in a total amount of 8.2 kg were simultaneously added thereto at constant addition rates of 52.0 kg/h and 2.3 kg/h, respectively, and the state was kept as it was for 5 minutes after completion of the addition.

(4) Further, 6.3 kg of a styrene monomer was added thereto all at once to complete the polymerization.

(5) Finally, all the polymerizable active terminals were deactivated with water to obtain a polymer liquid containing a polymer having a weight average molecular weight of 145,000 and having a polystyrene block portion and a random structure portion of styrene and butadiene.

REFERENCE EXAMPLE 14

(1) Into a reactor, 525 kg of the polymerization solvent and 45.0 kg of a styrene monomer were charged and maintained at 30° C.

(2) 1,700 mL of the polymerization catalyst solution was added thereto, and the styrene monomer was subjected to anionic polymerization.

(3) After the rate of polymerization of the styrene monomer exceeded 99%, while maintaining the internal temperature of the reaction system at 30° C., 9.0 kg of butadiene was added thereto all at once, and it was successively reacted.

(4) After the rate of polymerization of the butadiene monomer exceeded 99%, while maintaining the internal temperature of the reaction system at 80° C., a styrene monomer in a total amount of 121.2 kg and butadiene in a total amount of 16.1 kg were simultaneously added thereto at constant addition rates of 181.9 kg/h and 24.2 kg/h, respectively, and the state was kept as it was for 20 minutes after completion of the addition.

(5) After the internal temperature was lowered to 50° C., 33.8 kg of the styrene monomer was further added thereto all at once to complete the polymerization.

(6) Finally, all the polymerizable active terminals were deactivated with water to obtain a polymer liquid containing a polymer having a weight average molecular weight of 175,000 and having a polystyrene block portion, a block portion of polybutadiene and a random structure portion of styrene and butadiene.

REFERENCE EXAMPLE 15

(1) Into a reactor, 525 kg of the polymerization solvent and 56.5 kg of a styrene monomer were charged and maintained at 30° C.

(2) 1,700 mL of the polymerization catalyst solution was added thereto, and the styrene monomer was subjected to anionic polymerization.

(3) After the rate of polymerization of the styrene monomer exceeded 99%, while maintaining the internal temperature of the reaction system at 30° C., 19.9 kg of butadiene was added thereto all at once, and it was successively reacted.

(4) After the rate of polymerization of the butadiene monomer exceeded 99%, while maintaining the internal temperature of the reaction system at 80° C., successively a styrene monomer in a total amount of 78.3 kg and butadiene in a total amount of 13.9 kg were simultaneously added thereto at constant addition rates of 117.5 kg/h and 20.9 kg/h, respectively, and the state was kept as it was for 10 minutes after completion of the addition.

(5) After the internal temperature was lowered to 50° C., 56.5 kg of a styrene monomer was added thereto all at once to complete the polymerization.

(6) Finally, all the polymerizable active terminals were deactivated with water to obtain a polymer liquid containing a polymer having a weight average molecular weight of 178,000 and having a polystyrene block portion, a block portion of polybutadiene and a random structure portion of styrene and butadiene.

REFERENCE EXAMPLE 16

(1) Into a reactor, 525 kg of the polymerization solvent and 7.9 kg of a styrene monomer were charged and maintained at 30° C.

(2) 1,700 mL of the polymerization catalyst solution was added thereto, and the styrene monomer was subjected to anionic polymerization.

(3) After the rate of polymerization of the styrene monomer exceeded 99%, while maintaining the internal temperature of the reaction system at 30° C., successively a styrene monomer in a total amount of 184.2 kg and butadiene in a total amount of 25.1 kg were simultaneously added thereto all at once, and polymerized while water cooling was strengthened so that the temperature of the reaction system would not exceed 70° C.

(4) After the rates of polymerization of butadiene and the styrene monomer exceeded 99% respectively, the internal temperature was lowered to 50° C., and then 7.9 kg of a styrene monomer was further added thereto all at once to complete the polymerization.

(5) Finally, all the polymerizable active terminals were deactivated with water to obtain a polymer liquid containing a polymer having a weight average molecular weight of 176,000 and having a polystyrene block portion and a graded structure portion of styrene and butadiene.

REFERENCE EXAMPLE 17

(1) Into a reactor, 490 kg of the polymerization solvent and 8.4 kg of a styrene monomer were charged and maintained at 30° C.

(2) 1,200 mL of a 10 wt % cyclohexane solution of n-butyllithium (hereinafter referred to as polymerization catalyst solution) was added thereto, and the styrene monomer was subjected to anionic polymerization.

(3) Polymerization was carried out until the rate of polymerization of the styrene monomer exceeded 99%, and then while maintaining the internal temperature of the reaction system at 80° C., a styrene monomer in a total amount of 92.4 kg and butadiene in a total amount of 11.3 kg were simultaneously added thereto at constant addition rates of 61.3 kg/h and 7.5 kg/h, respectively, and the state was kept as it was for 5 minutes after completion of the addition.

(4) Polymerization was carried out until the rate of polymerization of butadiene exceeded 99%, and then while maintaining the internal temperature of the reaction system at 80° C., 24.4 kg of butadiene was added thereto all at once, and it was successively reacted.

(5) 73.5 kg of a styrene monomer was further added thereto all at once to complete the polymerization.

(6) Finally, all the polymerizable active terminals were deactivated with water to obtain a polymer liquid containing a polymer having a polybutylene block portion, a block portion of polybutadiene and a random structure portion of styrene and butadiene.

REFERENCE EXAMPLE 18

(1) Into a reactor, 490 kg of the polymerization solvent and 8.4 kg of a styrene monomer were charged and maintained at 30° C.

(2) 1,830 mL of the polymerization catalyst solution was added thereto, and the styrene monomer was subjected to anionic polymerization.

(3) Polymerization was carried out until the rate of polymerization of the styrene monomer exceeded 99%, and then while maintaining the internal temperature of the reaction system at 80° C., a styrene monomer in a total amount of 113.4 kg and butadiene in a total amount of 10.1 kg were simultaneously added thereto at constant addition rates of 75.2 kg/h and 6.7 kg/h, respectively, and the state was kept as it was for 5 minutes after completion of the addition.

(4) Polymerization was carried out until the rate of polymerization of butadiene exceeded 99%, and then while maintaining the internal temperature of the reaction system at 80° C., 25.6 kg of butadiene was added thereto all at once, and it was successively reacted.

(5) 52.5 kg of a styrene monomer was further added thereto all at once to complete the polymerization.

(6) Finally, all the polymerizable active terminals were deactivated with water to obtain a polymer liquid containing a polymer having a polybutylene block portion, a block portion of polybutadiene and a random structure portion of styrene and butadiene.

REFERENCE EXAMPLE 19

(1) Into a reactor, 490 kg of cyclohexane as the polymerization solvent was charged and maintained at 80° C.

(2) 820 mL of the polymerization catalyst solution, 35 g of potassium tert-butoxide as a randomizing agent and 70 g of tetrahydrofuran were preliminarily added thereto, and 9.5 kg of a styrene monomer was charged thereto all at once, and anionic polymerization was carried out until the rate of polymerization of the styrene monomer exceeded 99%.

(3) While maintaining the internal temperature of the reaction system at 80° C., 37.8 kg of a styrene monomer and 1.7 kg of butadiene were simultaneously charged thereto, and maintained until the rates of polymerization of the styrene monomer and butadiene exceeded 99%. This operation was repeated five times in total.

(4) Further, 3.2 kg of a styrene monomer was added thereto all at once to complete the polymerization.

(5) Finally, all the polymerizable active terminals were deactivated with water to obtain a polymer liquid containing a polymer having a polystyrene block portion and a random structure portion of styrene and butadiene.

REFERENCE EXAMPLE 20

(1) Into a reactor, 368 kg of the polymerization solvent and 6.3 kg of a styrene monomer were charged and maintained at 30° C.

(2) 910 mL of the polymerization catalyst solution was added thereto, and the styrene monomer was subjected to anionic polymerization.

(3) Polymerization was carried out until the rate of polymerization of the styrene monomer exceeded 99%, and then while maintaining the internal temperature of the reaction system at 80° C., a styrene monomer in a total amount of 101.1 kg and butadiene in a total amount of 14.2 kg were simultaneously added thereto at constant addition rates of 67.1 g/h and 9.5 kg/h, respectively, and the state was kept as it was for 5 minutes after completion of the addition.

(4) Polymerization was carried out until the rate of polymerization of butadiene exceeded 99%, and then while maintaining the internal temperature of the reaction system at 80° C., 12.6 kg of butadiene was added thereto all at once, and it was successively reacted.

(5) Further, 23.7 kg of a styrene monomer was added thereto all at once to complete the polymerization.

(6) Finally, all the polymerizable active terminals were deactivated with water to obtain a polymer liquid containing a polymer having a polystyrene block portion, a block portion of polybutadiene and a random structure portion of styrene and butadiene.

REFERENCE EXAMPLE 21

(1) Into a reactor, 490 kg of the polymerization solvent and 8.4 kg of a styrene monomer were charged and maintained at 30° C.

(2) 1,650 mL of the polymerization catalyst solution was added thereto, and the styrene monomer was subjected to anionic polymerization.

(3) Polymerization was carried out until the rate of polymerization of the styrene monomer exceeded 99%, and then while maintaining the internal temperature of the reaction system at 80° C., a styrene monomer in a total amount of 92.4 kg and butadiene in a total amount of 11.3 kg were simultaneously added thereto at constant addition rates of 61.3 kg/h and 7.5 kg/h, respectively, and the state was kept as it was for 5 minutes after completion of the addition.

(4) Polymerization was carried out until the rate of polymerization of butadiene exceeded 99%, and then while maintaining the internal temperature of the reaction system at 80° C., 24.4 kg of butadiene was added thereto all at once, and it was successively reacted.

(5) Further, 73.5 kg of a styrene monomer was added thereto all at once to complete the polymerization.

(6) Finally, all the polymerizable active terminals were deactivated with water to obtain a polymer liquid containing a polymer having a polystyrene block portion, a block portion of polybutadiene and a random structure portion of styrene and butadiene.

REFERENCE EXAMPLE 22

(1) Into a reactor, 490 kg of the polymerization solvent and 6.3 kg of a styrene monomer were charged and maintained at 30° C.

(2) 1,620 mL of the polymerization catalyst solution was added thereto, and the styrene monomer was subjected to anionic polymerization.

(3) After the rate of polymerization of the styrene monomer exceeded 99%, while maintaining the internal temperature of the reaction system at 50° C., 34.6 kg of butadiene was added thereto all at once, and it was successively reacted.

(4) After the rate of polymerization of the butadiene monomer exceeded 99%, while maintaining the internal temperature of the reaction system at 80° C., a styrene monomer in a total amount of 156.0 kg and butadiene in a total amount of 6.8 kg were simultaneously added thereto at constant addition rates of 52.0 kg/h and 2.3 kg/h, respectively, and the state was kept as it was for 5 minutes after completion of the addition.

(5) Further, 6.3 kg of a styrene monomer was added thereto all at once to complete the polymerization.

(6) Finally, all the polymerizable active terminals were deactivated with water to obtain a polymer liquid containing a polymer having a weight average molecular weight of 146,000 and having a polystyrene block portion, a block portion of polybutadiene and a random structure portion of styrene and butadiene.

REFERENCE EXAMPLE 23

(1) Into a reactor, 490 kg of cyclohexane as the polymerization solvent was charged and maintained at 80° C.

(2) 1,650 mL of a 10 wt % cyclohexane solution of n-butylithium as the polymerization catalyst solution, 35 g of potassium tert-butoxide as a randomizing agent and 70 g of tetrahydrofuran were preliminarily added thereto, and 10.5 kg of a styrene monomer was charged thereto all at once and subjected to anionic polymerization until the rate of polymerization of the styrene monomer exceeded 99%.

(3) Then, while maintaining the internal temperature of the reaction system at 80° C., 34 kg of a styrene monomer and 3.8 kg of butadiene were simultaneously charged thereto, and maintained until the rates of polymerization of the styrene monomer and butadiene exceeded 99% respectively. This operation was repeated five times in total.

(4) Further, 10.5 kg of a styrene monomer was added thereto all at once to complete the polymerization.

(5) Finally, all the polymerizable active terminals were deactivated with water to obtain a polymer liquid containing a polymer having a weight average molecular weight of 159,000 and having a polystyrene block portion and a random structure portion of styrene and butadiene.

REFERENCE EXAMPLE 24

(1) Into a reactor, 525 kg of the polymerization solvent and 8.4 kg of a styrene monomer were charged and maintained at 30° C. In the following Examples and Comparative Examples, cyclohexane was employed as the polymerization solvent.

(2) 1,240 mL of the polymerization catalyst solution was added thereto, and the styrene monomer was subjected to anionic polymerization. In the following Examples and Comparative Examples, a 10 wt % cyclohexane solution of n-butylithium was employed as the polymerization catalyst solution.

(3) After the styrene monomer was completely consumed, while maintaining the internal temperature of the reaction system at 30° C., 14.7 kg of butadiene was added thereto all at once, and it was successively reacted.

(4) After the butadiene gas was completely consumed, while maintaining the internal temperature of the reaction system at 80° C., successively a styrene monomer in a total amount of 155.3 kg and butadiene in a total amount of 23.2 kg were simultaneously added thereto at constant addition rates of 56.9 kg/h and 8.5 kg/h, respectively, and the state was kept as it was for 10 minutes after completion of the addition.

(5) After the internal temperature was lowered to 50° C., 8.4 kg of a styrene monomer was further added thereto all at once to complete the polymerization.

(6) Finally, all the polymerizable active terminals were deactivated with water to obtain a polymer liquid containing a polymer having a weight average molecular weight (value as calculated as polystyrene by GPC, the same applies hereinafter) of 204,000 and having a polystyrene block portion, a block portion of polybutadiene and a random structure portion of styrene and butadiene.

REFERENCE EXAMPLE 25

(1) Into a reactor, 490 kg of the polymerization solvent and 8.4 kg of a styrene monomer were charged and maintained at 30° C.

(2) 1,990 mL of the polymerization catalyst solution was added thereto, and the styrene monomer was subjected to anionic polymerization.

(3) After the styrene monomer was completely consumed, while maintaining the internal temperature of the reaction system at 50° C., 22.1 kg of butadiene was added thereto all at once, and it was successively reacted.

(4) After the butadiene gas was completely consumed, while maintaining the internal temperature of the reaction system at 80° C., successively a styrene monomer in a total amount of 157.5 kg and butadiene in a total amount of 13.7 kg were simultaneously added thereto at constant addition rates of 97.7 kg/h and 8.5 kg/h, respectively, and the state was kept as it was for 5 minutes after completion of the addition.

(5) After the internal temperature was lowered to 50° C., 8.4 kg of a styrene monomer was further added thereto all at once to complete the polymerization.

(6) Finally, all the polymerizable active terminals were deactivated with water to obtain a polymer liquid containing a polymer having a weight average molecular weight of 127,000 and having a polystyrene block portion, a block portion of polybutadiene and a random structure portion of styrene and butadiene.

REFERENCE EXAMPLE 26

(1) Into a reactor, 525 kg of the polymerization solvent and 8.4 kg of a styrene monomer were charged and maintained at 30° C.

(2) 1,680 mL of the polymerization catalyst solution was added thereto, and the styrene monomer was subjected to anionic polymerization.

(3) After the styrene monomer was completely consumed, while maintaining the internal temperature of the reaction system at 30° C., 8.5 kg of butadiene was added thereto all at once, and it was successively reacted.

(4) After the butadiene gas was completely consumed, while maintaining the internal temperature of the reaction system at 80° C., successively a styrene monomer in a total amount of 162.0 kg and butadiene in a total amount of 22.7 kg were simultaneously added thereto at constant addition rates of 60.7 kg/h and 8.5 kg/h, respectively, and the state was kept as it was for 10 minutes after completion of the addition.

(5) After the internal temperature was lowered to 50° C., 8.4 kg of a styrene monomer was further added thereto all at once to complete the polymerization.

(6) Finally, all the polymerizable active terminals were deactivated with water to obtain a polymer liquid containing a polymer having a weight average molecular weight of 151,000 and having a polystyrene block portion, a block portion of polybutadiene and a random structure portion of styrene and butadiene.

REFERENCE EXAMPLE 27

(1) Into a reactor, 525 kg of the polymerization solvent and 71.7 kg of a styrene monomer were charged and maintained at 30° C.

(2) 2,120 mL of the polymerization catalyst solution was added thereto, and the styrene monomer was subjected to anionic polymerization.

(3) After the styrene monomer was completely consumed, while maintaining the internal temperature of the reaction system at 30° C., 25.3 kg of butadiene was added thereto all at once and it was successively reacted.

(4) After the butadiene gas was completely consumed, while maintaining the internal temperature of the reaction system at 30° C., 107.5 kg of a styrene monomer and 6.3 kg of butadiene were further added thereto all at once to complete the polymerization.

(5) Finally, all the polymerizable active terminals were deactivated with water to obtain a polymer liquid containing a polymer having a weight average molecular weight of 119,000 and having a polystyrene block portion, a block portion of polybutadiene and a graded structure portion of styrene and butadiene.

REFERENCE EXAMPLE 28

(1) Into a reactor, 525 kg of the polymerization solvent and 8.4 kg of a styrene monomer were charged and maintained at 30° C.

(2) 1,830 mL of the polymerization catalyst solution was added thereto, and the styrene monomer was subjected to anionic polymerization.

(3) After the styrene monomer was completely consumed, while maintaining the internal temperature of the reaction system at 30° C., 8.5 kg of butadiene was added thereto all at once, and it was successively reacted.

(4) After the butadiene gas was completely consumed, while maintaining the internal temperature of the reaction system at 80° C., successively a styrene monomer in a total amount of 162.0 kg and butadiene in a total amount of 22.7 kg were simultaneously added thereto at constant addition rates of 60.7 kg/h and 8.5 kg/h, respectively, and the state was kept as it was for 10 minutes after completion of the addition.

(5) After the internal temperature was lowered to 50° C., 8.4 kg of a styrene monomer was further added thereto all at once to complete the polymerization.

(6) Finally, all the polymerizable active terminals were deactivated with water to obtain a polymer liquid containing a polymer having a weight average molecular weight of 139,000 and having a polystyrene block portion, a block portion of polybutadiene and a random structure portion of styrene and butadiene.

REFERENCE EXAMPLE 29

(1) Into a reactor, 525 kg of the polymerization solvent and 71.7 kg of a styrene monomer were charged and maintained at 30°C.

(2) 1,420 mL of the polymerization catalyst solution was added thereto, and the styrene monomer was subjected to anionic polymerization.

(3) After the styrene monomer was completely consumed, while maintaining the internal temperature of the reaction system at 30° C., 31.6 kg of butadiene was added thereto all at once, and it was successively reacted.

(4) After the butadiene gas was completely consumed, while maintaining the internal temperature at 50° C., 107.5 kg of a styrene monomer was further added thereto all at once to complete the polymerization.

(5) Finally, all the polymerizable active terminals were deactivated with water to obtain a polymer liquid containing a polymer having a weight average molecular weight of 182,000 and divided into a polystyrene block portion and a polybutadiene block portion.

REFERENCE EXAMPLE 30

(1) Into a reactor, 525 kg of the polymerization solvent and 31.5 kg of a styrene monomer were charged and maintained at 30° C.

(2) 1,020 mL of the polymerization catalyst solution was added thereto, and the styrene monomer was subjected to anionic polymerization.

(3) After the styrene monomer was completely consumed, while maintaining the internal temperature of the reaction system at 30° C., 16.8 kg of butadiene was added thereto all at once, and it was successively reacted.

(4) After the butadiene gas was completely consumed, while maintaining the internal temperature of the reaction system at 80° C., successively a styrene monomer in a total amount of 134.4 kg and butadiene in a total amount of 18.9 kg were simultaneously added thereto at constant addition rates of 60.4 kg/h and 8.5 kg/h, respectively, and the state was kept as it was for 10 minutes after completion of the addition.

(5) After the internal temperature was lowered to 50° C., 8.4 kg of a styrene monomer was further added thereto all at once to complete the polymerization.

(6) Finally, all the polymerizable active terminals were deactivated with water to obtain a polymer liquid containing a polymer having a weight average molecular weight of 252,000 and having a polystyrene block portion, a block portion of polybutadiene and a random structure portion of styrene and butadiene.

REFERENCE EXAMPLE 31

(1) Into a reactor, 525 kg of the polymerization solvent and 86.1 kg of a styrene monomer were charged and maintained at 30° C.

(2) 5,100 mL of the polymerization catalyst solution was added thereto, and the styrene monomer was subjected to anionic polymerization.

(3) After the styrene monomer was completely consumed, while maintaining the internal temperature of the reaction system at 30° C., 37.8 kg of butadiene was added thereto all at once, and it was successively reacted.

(4) After the butadiene gas was completely consumed, while maintaining the internal temperature at 50° C., 86.1 kg of a styrene monomer was further added thereto all at once to complete the polymerization.

(5) Finally, all the polymerizable active terminals were deactivated with water to obtain a polymer liquid containing a polymer having a weight average molecular weight of 49,000 and divided into a polystyrene block portion and a polybutadiene block portion.

REFERENCE EXAMPLE 32

(1) Into an autoclave equipped with a stirrer having an internal capacity of 250 L, 120 kg of pure water, 120 g of tribasic calcium phosphate as a dispersion stabilizer, 0.12 g of potassium persulfate and 0.06 g of sodium dodecylbenzenesulfonate were added and stirred at 100 rpm.

(2) Then, a solution having 70 kg of styrene, 15 kg of methyl methacrylate, 15 kg of n-butyl acrylate, 200 g of t-butylperoxy-2-ethylhexanoate and 50 g of 1,1-bis(t-hexylperoxy)3,3,5-trimethylcyclohexane as initiators, and 50 g of α-methylstyrene dimer as a chain transfer agent mixed therein, was charged thereto, the autoclave was sealed, and polymerization was carried out at 90° C. for 6 hours and at 120° C. for 2 hours.

(3) Beads obtained by the polymerization were neutralized, washed, dehydrated and dried, and then a copolymer resin in the form of pellets was obtained by using an extruder. The weight average molecular weight was 260,000.

REFERENCE EXAMPLE 33

(1) To an autoclave having a capacity of 200 L, 115 kg of pure water, 500 g of potassium oleate, 75 g of sodium pyrophosphate, 1.5 g of ferrous sulfate, 2.2 g of sodium ethylenediaminetetraacetate and 22 g of Rongalite were added and uniformly dissolved with stirring.

(2) Then, 20.0 kg of styrene, 30.0 kg of butadiene, 148 g of t-dodecylmercaptan, 30 g of divinylbenzene and 96 g of diisopropylbenzene hydroperoxide were added thereto, and reaction was carried out with stirring at 50° C. for 16 hours to complete the polymerization, and a rubber polymer latex was obtained.

(3) To the obtained rubber-like polymer latex, 45 g of sodium sulfosuccinate was added for adequate stabilization, and then a 0.2% hydrochloric acid aqueous solution and a 2% caustic acid aqueous solution were added thereto from separate nozzles while maintaining the pH of the latex at from 8 to 9, by adjusting the addition rates, stirring rate and the like, for agglomeration and enlargement of latex to obtain a rubber-like elastic body latex having an average particle size of 0.35 μm.

(4) 30 kg of the rubber-like elastic body latex as calculated as a solid content was weighed and transferred to an autoclave having a capacity of 200 L, 80 kg of pure water was added thereto, and the temperature was raised to 50° C. in a stream of nitrogen while stirring.

(5) 2 kg of pure water having 1.25 g of ferrous sulfate, 2.5 g of sodium ethylenediaminetetraacetate and 100 g of Rongalite dissolved therein was added thereto, and a mixture comprising 16 kg of styrene, 14 kg of methyl methacrylate and 60 g of t-dodecylmercaptan, and a solution having 120 g of diisopropylbenzene hydroperoxide dispersed in 8 kg of pure water containing 450 g of potassium oleate, were separately added thereto continuously over a period of 6 hours.

(6) After completion of the addition, the temperature was raised to 70° C., 30 g of diisopropylbenzene hydroperoxide was added thereto, and then the mixture was left to stand for 2 hours to complete the polymerization.

(7) An antioxidant was added to the obtained emulsion, the solid content was diluted to 15% with pure water, then the temperature was raised to 60° C., and diluted sulfuric acid was added thereto with vigorously stirring for salting-out, and the temperature was raised to 90° C. for solidification.

(8) Finally, dehydration, washing with water and drying were carried out to obtain a powder type graft copolymer.

The refractive index was 1.548 as calculated from the composition of the monomer units constituting the obtained graft copolymer.

Each of the polymers of Reference Examples, Examples and Comparative Examples in a solution state was, after preliminary concentration of the polymerization solvent by itself or in a mixed state in a predetermined weight ratio, subjected to devolatilization treatment by means of a vent type extruder and formed into pellets, which were subjected to granulation with the composition as it was or after melt-mixed again with a polymer of another Reference Example or the like, and subjected to the following tests.

Further, for some of the compositions and the multilayer films of Examples and Comparative Examples of the present invention, in addition to e.g. the block copolymers of e.g. Reference Examples, a general purpose polystyrene having a weight average molecular weight of 270,000, high-impact polystyrene (manufactured by TOYO-STYRENE CO., LTD.: E640N) or a SBS resin (manufactured by Denki Kagaku Kogyo K.K.: CLEAREN 730L) was employed. The data of the weight average molecular weight and dynamic viscoelasticity regarding CLEAREN 730L is shown in Table 22.

In a case where the block copolymer (composition) of the present invention and these resins were combined to form a composition, a method of melt-kneading pellets to form a pellet-form resin composition again was employed.

Of each of the block copolymers (compositions) of Reference Examples, Examples and Comparative Examples, the molecular weight, the refractive index, the temperature dependency of dynamic viscoelasticity behavior, the heat shrinkage factor, the spontaneous shrinkage factor and Haze (cloudiness) were measured by the following methods depending upon the purpose.

Measurement of Molecular Weight

The weight average molecular weight was measured by means of the following GPC measuring apparatus under the following conditions.

Apparatus: "SYSTEM-21 Shodex (Showa Denko K.K.)
Column: three columns of PL gel MIXED-B in series
Temperature: 40° C.
Detection: differential refractive index
Solvent: tetrahydrofuran
Concentration: 2 wt %
Analytical curve: prepared by using standard polystyrene (manufactured by PL), and the weight average molecular weight was represented as calculated as polystyrene.

The weight average molecular weight of the aromatic hydrocarbon block incorporated in the block copolymer obtained as the case requires, is a value obtained by GPC measurement of the vinyl aromatic hydrocarbon polymer component obtained by ozonolysis of the block copolymer [Y. TANAKA, et al., RUBBER CHEMISTRY AND TECHNOLOGY, 58, 16 (1985)] and calculation in accordance with the above method.

Measurement of Dynamic Viscoelasticity

The loss tangent value of each of the polymers (compositions) of Reference Examples, Examples and Comparative Examples was measured by means of dynamic viscoelasticity method in accordance with the following procedure.

(1) Pellets of each polymer were pressed under heating at from 200 to 250° C. to prepare a sheet having a thickness of from 0.1 to 0.5 mm.

(2) From this sheet, a test specimen having an appropriate size was cut out, stored in a room at 23° C. at 50% RH for at least 24 hours to carry out curing treatment, and then the storage elastic modulus and loss elastic modulus characteristic to the polymer in the form of the test specimen were measured by using the following apparatus while changing the temperature, and the loss tangent value was calculated.

Apparatus: solid viscoelasticity measuring apparatus RSA2 manufactured by Rheometrics Temperature range: room temperature to 130° C.

Temperature-raising rate: 4° C./min

Measurement frequency: 1 Hz

Measurement of Refractive Index

The refractive index of the polymer produced in Reference Example 32 was measured in accordance with the following procedure.

(1) A test specimen having a size of 120 mm×120 mm×2 mm was formed by means of an injection molding machine (IS-80CVN) manufactured by TOSHIBA MACHINE CO. LTD. at a cylinder temperature of 220° C.

(2) Using the test specimen, the refractive index was measured by using the following apparatus under the following conditions in accordance with JIS K7105.

Apparatus: digital refractometer RX-2000 manufactured by ATAGO CO., LTD.

Temperature: 25° C.

The refractive index of the copolymer resin at 25° C. was 1.561.

As it is difficult to actually measure the refractive index of the graft copolymer of Reference Example 33, in the present specification, the compositional ratio of the monomer units constituting the graft copolymer is measured by means of composition analysis, and the refractive index is obtained by calculation by means of the following formula:

$$N = XA \times nA + XB \times nB + XC \times nC + \ldots$$

Namely, in a case where the composition of the monomer units constituting the graft copolymer comprises an Am monomer: XA, a Bm monomer: XB and a Cm monomer: XC (provided that XA+XB+XC=1 by the weight ratio), it is presumed that nA means the refractive index of the polymer consisting of the Am monomer, nB means the refractive index of the polymer consisting of the Bm monomer, and nC means the refractive index of the polymer consisting of the Cm monomer, and the refractive index of the copolymer is obtained by calculation by assigning these values to the above formula. The refractive index as calculated from the composition of the monomer units constituting the obtained graft copolymer was 1.548.

An oriented film for measurement of the heat shrinkability and spontaneous shrinkability of the heat shrinkable film made of the block copolymer (composition) of the present invention was prepared in accordance with the following procedure.

(1) Pellets in each of Examples and Comparative Examples were formed into an extruded sheet having a thickness of 0.25 mm by means of the following apparatus ①, and a sheet piece of 9 cm square was cut out from the sheet along the extrusion direction axis (the direction along the extrusion axis will be referred to as "MD direction", and the direction perpendicular to the MD direction will be referred to as "TD direction").

(2) The sheet piece was oriented five times in the TD direction while heating at a predetermined temperature as identified in each of Tables 4 to 12 by means of the following apparatus ② to prepare a heat shrinkable film.

Apparatus ①: 40 mmφ single axis extruder VE40 (with a T-die with a width of 40 cm) manufactured by Tanabe Plastic Kikai K.K.

Apparatus ②: biaxial orienting machine manufactured by Toyo Seiki K.K.

A heat shrinkable multilayer film was prepared in such a manner that a multilayer sheet with a predetermined layer constitution with a thickness of 0.25 mm was obtained by means of a multilayer sheet extruder with feed block, and the multilayer sheet was oriented in the same manner as for a single layer oriented film.

Measurement of Film Formation Property

The film formation property of each of the resin compositions of Examples and Comparative Examples was judged as follows by visually observing the state (surface roughening, presence or absence of striped patterns) of the surface of the oriented film.

○: favorable film formation property with no surface roughening or striped pattern observed Δ: slight surface roughening or striped pattern observed X: inadequate improvement with surface roughening or striped pattern confirmed Measurement of Heat Shrinkage Factor The heat shrinkage factor of the obtained oriented film was measured by the following method.

(1) A test specimen having a size of 10 mm in the MD direction and 120 mm in the TD direction was cut out from the oriented film.

(2) Marked lines with an interval of 100.0 mm were drawn in the TD direction of the test specimen.

(3) The test specimen was immersed in warm water of 70° C. for 30 seconds and taken out. The attached moisture was wiped out, and the distance L between the marked lines was measured by means of a caliper down to 0.1 mm.

(4) The heat shrinkage factor was calculated by the following formula. A heat shrinkage factor of at least 15% was used as a guide for practical use:

$$\text{Heat shrinkage factor } (\%) = \{(100.0 - L)/100.0\} \times 100$$

Measurement of Spontaneous Shrinkage Factor

The spontaneous shrinkage factor of the oriented film was measured by the following method.

(1) From an oriented film prepared under the same conditions as for the oriented film, the heat shrinkage factor of which was measured, a test specimen having a size of about 75 mm in the MD direction and about 400 mm in the TD direction was cut out.

(2) Marked lines with an interval of 300.0 mm were drawn in the TD direction of the test specimen.

(3) The oriented film was stored in an environmental testing machine of 30° C.

(4) After storage of 30 days, the film was taken out, and the distance L (mm) between the marked lines was measured by means of a caliper down to 0.1 mm.

(5) The spontaneous shrinkage factor was calculated from the following formula. A spontaneous shrinkage factor not exceeding 1.5% relative to a conventional material was employed as a guideline of improvement:

Spontaneous shrinkage factor (%)={(300.0−L)/300.0}×100

Measurement of Cloudiness

The cloudiness of the oriented film was measured by means of the following apparatus in accordance with ASTM D1003.

Apparatus: Haze meter NDH-1001DP model manufactured by Nippon Denshoku Industries Co., Ltd.

EXAMPLES

As Examples 1 to 57 and Comparative Examples 1 to 12, using each of the block copolymers as identified in the above Reference Examples 1 to 31 by itself, as a composition with a product of another Reference Example or as a composition with another resin, or each of the vinyl aromatic hydrocarbon polymers of Reference Examples 32 and 33, formation was carried out by the following method into each of formulations as identified in Tables 1 to 21, and the physical properties were evaluated. The evaluation results are also shown in Tables 1 to 21.

As evident from the results shown in Tables, in Examples regarding the block copolymer (composition) of the present invention and a film made of it, the low temperature shrinkability, the spontaneous shrinkage resistance, the range of the orienting conditions and the outer appearance were excellent, whereas in comparison regarding a composition and a film which do not satisfy the conditions of the present invention, any of low temperature shrinkability, spontaneous shrinkage resistance, film formation property and the outer appearance of the film was poor.

In Tables 1 to 4, Examples wherein the heat shrinkage factor and the spontaneous shrinkage factor of a heat shrinkable film and a heat shrinkable multilayer film made of a block copolymer comprising a vinyl aromatic hydrocarbon and a conjugated diene wherein the loss tangent value by dynamic viscoelasticity measurement has at least one maximum value within a temperature range of from 60 to 110° C., the loss tangent value at a temperature lower by 10° C. than the lowest temperature for the maximum value is at most 40% of the highest maximum value, and the loss tangent value at a temperature lower by 30° C. than the lowest temperature for the maximum value is at most 10% of the highest maximum value, were measured, are shown, and Comparative Examples are also shown.

By comparison among measured values in Tables 1 to 4, it is found that the block copolymer which satisfies conditions of the dynamic viscoelasticity behaviors, the heat shrinkable film and the heat shrinkable multilayer film made of the composition, satisfy favorable heat shrinkability and spontaneous shrinkage resistance.

TABLE 1

|  | Ex. 1 | Ex. 2 | Ex. 3 | Ex. 4 | Ex. 5 | Ex. 6 | Ex. 7 |
| --- | --- | --- | --- | --- | --- | --- | --- |
| Block copolymer | Ref. Ex. 1 | Ref. Ex. 2 | Ref. Ex. 3 | Ref. Ex. 4 | Ref. Ex. 5 | Ref. Ex. 6 | Ref. Ex. 7 |
| Temperature at which loss tangent value reaches maximum value within a range of from 60 to 110° C.: T (° C.) | 81 | 80 | 105 | 85 | 93 | 92 | 73 |
| Loss tangent value at temperature T° C.: X | 2.80 | 2.79 | 2.49 | 2.18 | 2.42 | 3.40 | 2.43 |
| Loss tangent value at a temperature of (T − 10)° C.: Y | 0.61 | 0.71 | 0.45 | 0.35 | 0.75 | 0.74 | 0.70 |
| Loss tangent value at a temperature of (T − 30)° C.: Z | 0.04 | 0.07 | 0.12 | 0.08 | 0.14 | 0.12 | 0.06 |
| Loss tangent value at 30° C. | 0.02 | 0.03 | 0.04 | 0.03 | 0.03 | 0.03 | 0.03 |
| Y/X × 100 (%) | 21.8 | 25.4 | 18.1 | 16.1 | 31.0 | 21.8 | 28.8 |
| Z/X × 100 (%) | 1.4 | 2.5 | 4.8 | 3.7 | 5.8 | 3.5 | 2.5 |
| Heat Shrinkage factor |  |  |  |  |  |  |  |
| Orienting temperature (° C.) | 93 | 93 | 113 | 93 | 102 | 102 | 85 |
| Heat shrinkage factor (%) | 20 | 18 | 15 | 22 | 15 | 16 | 23 |
| Orienting temperature (° C.) | 81 | 81 | 105 | 85 | 93 | 93 | 75 |
| Heat shrinkage factor (%) | 46 | 44 | 36 | 44 | 31 | 41 | 48 |
| Orienting temperature (° C.) | 81 | 81 | 105 | 85 | 93 | 93 | 75 |
| Spontaneous shrinkage factor (%) | 0.7 | 0.6 | 0.4 | 0.6 | 0.6 | 0.5 | 1.1 |

Heat shrinkage factor: Measured value regarding a film immersed in warm water of 80° C. for 30 seconds.
Spontaneous shrinkage factor: Measured value regarding a film stored in an environment at 30° C. for 30 days.

TABLE 2

|  | Comp. Ex. 1 | Comp. Ex. 2 | Comp. Ex. 3 | Comp. Ex. 4 |
| --- | --- | --- | --- | --- |
| Block copolymer | Ref. Ex. 8 | Ref. Ex. 9 | Ref. Ex. 10 | Ref. Ex. 11 |
| Temperature at which loss tangent value reaches maximum value within a range of from 50 to 120° C.: T (° C.) | 83 | 108 | 114 | 55 |

TABLE 2-continued

|  | Comp. Ex. 1 | Comp. Ex. 2 | Comp. Ex. 3 | Comp. Ex. 4 |
|---|---|---|---|---|
| Loss tangent value at temperature T° C.: X | 1.02 | 1.93 | 2.38 | 1.93 |
| Loss tangent value at a temperature of (T − 10)° C.: Y | 0.69 | 0.99 | 0.50 | 0.95 |
| Loss tangent value at a temperature of (T − 30)° C.: Z | 0.28 | 0.18 | 0.15 | 0.30 |
| Loss tangent value at 30° C. | 0.11 | 0.04 | 0.05 | 0.42 |
| Y/X × 100 (%) | 67.6 | 51.3 | 21.0 | 49.2 |
| Z/X × 100 (%) | 27.5 | 9.3 | 6.3 | 15.5 |
| Heat Shrinkage factor |  |  |  |  |
| Orienting temperature (° C.) | 96 | 116 | 122 | 78 |
| Heat shrinkage factor (%) | 20 | 15 | 8 | 27 |
| Orienting temperature (° C.) | 81 | 108 | 114 | 67 |
| Heat shrinkage factor (%) | 39 | 28 | 18 | 51 |
| Orienting temperature (° C.) | 81 | 108 | 114 | 67 |
| Spontaneous shrinkage factor (%) | 2.7 | 1.8 | 0.2 | 8.9 |

Heat shrinkage factor: Measured value regarding a film immersed in warm water of 80° C. for 30 seconds.
Spontaneous shrinkage factor: Measured value regarding a film stored in an environment at 30° C. for 30 days.

TABLE 3

|  | Ex. 8 | Ex. 9 | Ex. 10 | Ex. 11 |
|---|---|---|---|---|
| Blend ratio |  |  |  |  |
| Type | Ex. 1 | Ex. 1 | Ex. 7 | Ex. 7 |
| wt % | 90 | 60 | 65 | 65 |
| Type | Comp. Ex. 1 | Comp. Ex. 2 | GPPS | GPPS |
| wt % | 10 | 40 | 35 | 34.5 |
| Type |  |  |  | E640N |
| wt % |  |  |  | 0.5 |
| Temperature at which loss tangent value reaches maximum value within a range of from 60 to 110° C.: T (° C.) | 82 | 81 106 | 73 108 | 74 108 |
| Loss tangent value at temperature T for maximum value: X | 2.60 | 2.14 0.47 | 1.57 0.72 | 1.61 0.71 |
| Loss tangent value at a temperature of (Tmax − 10)° C.: Y | 0.62 | 0.53 | 0.52 | 0.54 |
| Loss tangent value at a temperature of (Tmax − 30)° C.: Z | 0.07 | 0. 04 | 0.05 | 0.06 |
| Loss tangent value at 30° C. | 0.04 | 0. 03 | 0.03 | 0.03 |
| Y/X × 100 (%) | 23.8 | 24.8 | 33.1 | 33.5 |
| Z/X × 100 (%) | 2.7 | 1.9 | 3.2 | 3.7 |
| Heat Shrinkage factor |  |  |  |  |
| Orienting temperature (° C.) | 93 | 93 | 85 | 85 |
| Heat shrinkage factor (%) | 20 | 18 | 15 | 22 |
| Orienting temperature (° C.) | 81 | 81 | 75 | 75 |
| Heat shrinkage factor (%) | 44 | 41 | 40 | 42 |
| Orienting temperature (° C.) | 81 | 81 | 75 | 75 |
| Spontaneous shrinkage factor (%) | 0.8 | 0.7 | 0.9 | 0.9 |

Heat shrinkage factor: Measured value regarding a film immersed in warm water of 80° C. for 30 seconds.
Spontaneous shrinkage factor: Measured value regarding a film stored in an environment at 30° C. for 30 days.
Tmax: Temperature for the highest maximum value

TABLE 4

|  | Ex. 12 | Ex. 13 | Ex. 14 | Comp. Ex. 5 |
|---|---|---|---|---|
| Surface layer and rear layer |  |  |  |  |
| Type | 730 L | Ex. 1 | 730 L | 730 L |
| wt % | 99.5 | 100 | 70 | 100 |

TABLE 4-continued

|  | Ex. 12 | Ex. 13 | Ex. 14 | Comp. Ex. 5 |
|---|---|---|---|---|
| Type | E640N |  | Returned material |  |
| wt % | 0.5 |  | 30 |  |
| Intermediate layer |  |  |  |  |
| Type | Ex. 1 | 730L | Ex. 1 | Comp. Ex. 1 |
| wt % | 100 | 100 | 70 | 100 |
| Type |  |  | Returned material |  |
| wt % |  |  | 30 |  |
| Thickness ratio of surface/intermediate /rear layers | 10/80/10 | 10/80/10 | 10/80/10 | 10/80/10 |
| Heat Shrinkage factor |  |  |  |  |
| Orienting temperature (° C.) | 93 | 93 | 93 | 93 |
| Heat shrinkage factor (%) | 15 | 16 | 23 | 18 |
| Orienting temperature (° C.) | 81 | 81 | 81 | 81 |
| Heat shrinkage factor (%) | 45 | 40 | 44 | 43 |
| Orienting temperature (° C.) | 81 | 81 | 81 | 81 |
| Spontaneous shrinkage factor (%) | 0.9 | 0.8 | 0.9 | 2.6 |

Heat shrinkage factor: Measured value regarding a film immersed in warm water of 80° C. for 30 seconds.
Spontaneous shrinkage factor: Measured value regarding a film stored in an environment at 30° C. for 30 days.
Returned material: Heat shrinkable multilayer film of Ex. 12 pulverized and then re-extruded.

In Tables 5 to 9, Examples wherein the heat shrinkage factor, the spontaneous shrinkage factor and the cloudiness of a block copolymer comprising a vinyl aromatic hydrocarbon and a conjugated diene, wherein the loss tangent value by dynamic viscoelasticity measurement has at least one maximum value within a range of from 60 to 110° C., the loss tangent value at a temperature lower by 10° C. than the lowest temperature for the maximum value is at most 40% of the highest maximum value, and the loss tangent value at a temperature lower by 30° C. than the lowest temperature for the maximum value is at most 10% of the highest maximum value, and a heat shrinkable film and a heat shrinkable multilayer film made of the specific composition, were measured, are shown, and Comparative Examples are also shown.

By comparison among values in Tables 5 to 9, it is found that the block copolymer which satisfies the conditions of the dynamic viscoelasticity behaviors, and the heat shrinkable film and the heat shrinkable multilayer film made of the specific composition, satisfy transparency while they have favorable heat shrinkability and spontaneous shrinkage resistance.

TABLE 5

|  | Ex. 15 | Ex. 16 | Ex. 17 | Comp. Ex. 6 | Comp. Ex. 7 |
|---|---|---|---|---|---|
| Block copolymer (A) | Ref. Ex. 12 | Ref. Ex. 13 | Ref. Ex. 14 | Ref. Ex. 15 | Ref. Ex. 16 |
| Temperature at which loss tangent value reaches maximum value within a range of from 60 to 110° C.: T (° C.) | 75 | 95 | 83 | 83 | 88 |
| Loss tangent value at temperature T° C.: X | 2.79 | 2.52 | 1.89 | 1.02 | 1.29 |
| Loss tangent value at a temperature of (T − 10)° C.: Y | 0.71 | 0.74 | 0.66 | 0.69 | 0.65 |
| Loss tangent value at a temperature of (T − 30)° C.: Z | 0.15 | 0.13 | 0.16 | 0.28 | 0.29 |
| Loss tangent value at 30° C. | 0.06 | 0.02 | 0.05 | 0.11 | 0.07 |
| Y/X × 100 (%) | 25.4 | 29.4 | 34.9 | 67.6 | 50.4 |
| Z/X × 100 (%) | 5.4 | 5.2 | 8.5 | 27.5 | 22.5 |
| Orienting temperature (° C.) | 80 | 95 | 85 | 85 | 90 |
| Heat shrinkage factor (70° C., 30 sec.) (%) | 28 | 20 | 23 | 19 | 18 |
| Spontaneous shrinkage factor (30° C., 30 days) (%) | 1.2 | 0.5 | 1.4 | 3.3 | 2.7 |
| Cloudiness (%) | 1.4 | 1.2 | 1.6 | 1.9 | 1.6 |

TABLE 6

|  | Ex. 18 | Ex. 19 | Ex. 20 | Ex. 21 |
|---|---|---|---|---|
| Blend ratio |  |  |  |  |
| Type | Ref. Ex. 12 | Ref. Ex. 12 | Ref. Ex. 12 | Ref. Ex. 13 |
| wt % | 80 | 60 | 40 | 75 |
| Type | Ref. Ex. 13 | Ref. Ex. 13 | Ref. Ex. 13 | Ref. Ex. 15 |
| wt % | 20 | 40 | 60 | 25 |
| Temperature at which loss tangent value reaches maximum value within a range of from 60 to 110° C.: T (° C.) | 75 | 75  94 | 76  95 | 89 |
| Loss tangent value at temperature T for the highest maximum value: Xmax | 2.32 | 1.52  0.83 | 0.99  1.38 | 2.01 |
| Loss tangent value at a temperature of (Tmin − 10)° C.: Y | 0.63 | 0.53 | 0.46 | 0.69 |
| Loss tangent value at a temperature of (Tmin − 30)° C.: Z | 0.14 | 0.11 | 0.08 | 0.19 |
| Loss tangent value at 30° C. | 0.05 | 0.04 | 0.03 | 0.05 |
| Y/Xmax × 100 (%) | 27.2 | 34.9 | 33.3 | 34.3 |
| Z/Xmax × 100 (%) | 6.0 | 7.2 | 5.8 | 9.5 |
| Orienting temperature (° C.) | 82 | 85 | 86 | 96 |
| Heat shrinkage factor (70° C., 30 sec.) (%) | 26 | 24 | 23 | 19 |
| Spontaneous shrinkage factor (30° C., 30 days) (%) | 1.1 | 0.9 | 0.6 | 0.8 |
| Cloudiness (%) | 1.9 | 2.4 | 2.2 | 1.5 |

Tmin: lowest temperature for maximum value within a temperature range of from 60 to 110° C.
Xmax: highest loss tangent value within a temperature range of from 60 to 110° C.

TABLE 7

|  | Ex. 22 | Ex. 23 |
|---|---|---|
| Blend ratio |  |  |
| Type | Ref. Ex. 13 | Ref. Ex. 13 |
| wt % | 90 | 85 |
| Type | Ref. Ex. 11 | Ref. Ex. 16 |
| wt % | 10 | 15 |
| Temperature at which loss tangent value reaches maximum value within a range of from 60 to 110° C.: T (° C.) | 95 | 94 |
| Loss tangent value at temperature T for the highest maximum value: Xmax | 2.03 | 1.79 |
| Loss tangent value at a temperature of (Tmin − 10)° C.: Y | 0.70 | 0.61 |
| Loss tangent value at a temperature of (Tmin − 30)° C.: Z | 0.15 | 0.16 |
| Loss tangent value at 30° C. | 0.08 | 0.04 |
| Y/Xmax × 100 (%) | 34.4 | 34.1 |
| Z/Xmax × 100 (%) | 7.4 | 8.9 |
| Orienting temperature (° C.) | 97 | 97 |
| Heat shrinkage factor (70° C., 30 sec.) (%) | 21 | 20 |
| Spontaneous shrinkage factor (30° C., 30 days) (%) | 0.9 | 0.7 |
| Cloudiness (%) | 2.2 | 2.1 |

Tmin: lowest temperature for maximum value within a temperature range of from 60 to 110° C.
Xmax: highest loss tangent value within a temperature range of from 60 to 110° C.

TABLE 8

|  | Ex. 24 | Ex. 25 | Ex. 26 | Ex. 27 |
|---|---|---|---|---|
| Blend ratio |  |  |  |  |
| Type | Ref. Ex. 12 | Ref. Ex. 12 | Ref. Ex. 13 | Ref. Ex. 13 |
| wt % | 65 | 50 | 70 | 70 |
| Type | GPPS | GPPS | Ref. Ex. 32 | Ref. Ex. 32 |
| wt % | 34.5 | 49.5 | 30 | 25 |
| Type | E640N | E640N |  | Ref. Ex. 33 |
| wt % | 0.5 | 0.5 |  | 5 |
| Temperature at which loss tangent value reaches maximum value within a range of from 60 to 110° C.: T (° C.) | 75  108 | 77  108 | 79  95 | 77  95 |

TABLE 8-continued

| | Ex. 24 | Ex. 25 | Ex. 26 | Ex. 27 |
|---|---|---|---|---|
| Loss tangent value at temperature T for the highest maximum value: Xmax | 1.75 0.60 | 0.57 1.81 | 0.32 1.72 | 0.41 1.89 |
| Loss tangent value at a temperature of (Tmin − 10)° C.: Y | 0.56 | 0.34 | 0.26 | 0.27 |
| Loss tangent value at a temperature of (Tmin − 30)° C.: Z | 0.12 | 0.09 | 0.11 | 0.13 |
| Loss tangent value at 30° C. | 0.04 | 0.03 | 0.05 | 0.06 |
| Y/Xmax × 100 (%) | 32.0 | 18.8 | 15.1 | 14.3 |
| Z/Xmax × 100 (%) | 6.8 | 5.0 | 6.4 | 6.9 |
| Orienting temperature (° C.) | 90 | 93 | 93 | 93 |
| Heat shrinkage factor (70° C., 30 sec.) (%) | 23 | 17 | 25 | 27 |
| Spontaneous shrinkage factor (30° C., 30 days) (%) | 0.9 | 0.6 | 0.9 | 1.1 |
| Cloudiness (%) | 2.3 | 2.2 | 2.3 | 2.3 |

Tmin: lowest temperature for maximum value within a temperature range of from 60 to 110° C.
Xmax: highest loss tangent value within a temperature range of from 60 to 110° C.

TABLE 9

| | Ex. 28 | Ex. 29 |
|---|---|---|
| Surface layer and rear layer | | |
| Type | Comp. Ex. 7 | Comp. Ex. 7 |
| wt % | 99.5 | 70 |
| Type | E640N | Returned material |
| wt % | 0.5 | 30 |
| Intermediate layer | | |
| Type | Ex. 19 | Ex. 25 |
| wt % | 100 | 70 |
| Type | | Returned material |
| wt % | | 30 |
| Thickness ratio of surface/intermediate/rear layers | 10/80/10 | 10/80/10 |
| Orienting temperature (° C.) | 86 | 92 |
| Heat shrinkage factor (70° C., 30 sec.) (%) | 23 | 17 |
| Spontaneous shrinkage factor (30° C., 30 days) (%) | 1.1 | 1.1 |
| Cloudiness (%) | 2.0 | 2.8 |

Returned material: Heat shrinkable multilayer film of Ex. 28 pulverized and then re-extruded For evaluation of the heat shrinkable (multilayer) film made of the block copolymer (composition) which satisfies conditions regarding the specific molecular structure and molecular weight, the weight average molecular weight of the random copolymer segment of the block copolymer used as a raw material, the weight average molecular weight of the whole and the weight average molecular weight of the polymer component which shows a highest peak after ozonolysis, are shown as Reference Examples in Table 10.

In Tables 11 and 12, Examples wherein the heat shrinkage factor, the spontaneous shrinkage factor and the film formation property of a block copolymer comprising a vinyl aromatic hydrocarbon and a conjugated diene, wherein the weight average molecular weights of the random copolymer segment in the block copolymer, the whole and the polymer component which shows a maximum peak after ozonolysis are within specific ranges, the loss tangent value by dynamic viscoelasticity measurement has at least one maximum value within a range of from 60 to 110° C., the loss tangent value at a temperature lower by 10° C. than the lowest temperature for the maximum value is at most 40% of the highest maximum value, and the loss tangent value at a temperature lower by 30° C. than the lowest temperature for the maximum value is at most 10% of the highest maximum value, and a heat shrinkable film and a heat shrinkable multilayer film made of the specific composition, were measured, are shown.

From the values shown in Tables 11 and 12, it is found that the block copolymer which satisfies the weight average molecular weight of the molecules and the conditions of the dynamic viscoelasticity behaviors, and the heat shrinkable film and the heat shrinkable multilayer film made of the specific composition, satisfy favorable film formation property while they have favorable heat shrinkability and spontaneous shrinkage resistance.

Further, from values shown in Tables 11 and 12, it is found that the heat shrinkable film and the heat shrinkable multilayer film made of a composition comprising block copolymers having a difference in temperature for the maximum and the highest loss tangent value of at least 3° C., selected among the block copolymers which show specific dynamic viscoelasticity behaviors, have a wide range of the temperature for film formation and satisfy favorable film formation property, while they have favorable heat shrinkability and spontaneous shrinkage resistance.

TABLE 10

| | Ref. Ex. 17 | Ref. Ex. 18 | Ref. Ex. 19 | Ref. Ex. 20 | Ref. Ex. 21 |
|---|---|---|---|---|---|
| Weight average molecular weight of random copolymer segment contained in a block comprising a conjugated diene and a vinyl aromatic hydrocarbon: MB (ten thousand) | 9.10 | 7.60 | 23.7 | 13.8 | 6.40 |

TABLE 10-continued

|  | Ref. Ex. 17 | Ref. Ex. 18 | Ref. Ex. 19 | Ref. Ex. 20 | Ref. Ex. 21 |
|---|---|---|---|---|---|
| Weight average molecular weight of block copolymer: M (ten thousand) | 18.3 | 12.1 | 27.8 | 18.2 | 13.5 |
| Weight average molecular weight of polymer which shows a highest peak in GPC measurement after ozonolysis: M' (ten thousand) | 5.87 | 2.76 | 3.09 | 2.70 | 5.12 |
| M'/M | 0.32 | 0.23 | 0.11 | 0.15 | 0.38 |

TABLE 11

|  | Ex. 30 | Ex. 31 | Ex. 32 | Ex. 33 | Ex. 34 |
|---|---|---|---|---|---|
| Blend |  |  |  |  |  |
| Type | Ref. Ex. 17 | Ref. Ex. 18 | Ref. Ex. 19 | Ref. Ex. 20 | Ref. Ex. 21 |
| wt % | 100 | 100 | 100 | 100 | 100 |
| Lowest temperature at which loss tangent value reaches maximum value within a range of from 60 to 110° C.: T (° C.) | 88.8 | 86.6 | 95.2 | 74.7 | 87.9 |
| Highest maximum value of loss tangent value: Xmax | 2.10 | 2.50 | 2.61 | 2.28 | 2.13 |
| Loss tangent value at a temperature of (T − 10)° C.: Y | 0.73 | 0.57 | 0.75 | 0.69 | 0.69 |
| Loss tangent value at a temperature of (T − 30)° C.: Z | 0.10 | 0.11 | 0.14 | 0.05 | 0.10 |
| Y/Xmax × 100 (%) | 34.7 | 22.8 | 28.7 | 30.3 | 32.4 |
| Z/Xmax × 100 (%) | 4.76 | 4.40 | 5.36 | 2.19 | 4.69 |
| Heat shrinkage factor |  |  |  |  |  |
| Orienting temperature (° C.) | 90 | 88 | 96 | 76 | 90 |
| Shrinkage factor (%, 70° C., 30 sec.) | 21 | 20 | 24 | 22 | 19 |
| Spontaneous shrinkage factor (%, 30° C., 30 days) | 0.7 | 0.8 | 0.9 | 1.1 | 0.7 |
| Film formation property (occurrence of failure in outer appearance such as wrinkles or dry scaly skin) | ○ | ○ | ○ | ○ | ○ |

TABLE 12

|  | Ex. 35 | Ex. 36 | Ex. 37 | Ex. 38 | Ex. 39 |
|---|---|---|---|---|---|
| Blend |  |  |  |  |  |
| Type | Ref. Ex. 17 | Ref. Ex. 18 | Ref. Ex. 18 | Ref. Ex. 21 | Ref. Ex. 21 |
| wt % | 33 | 33 | 67 | 70 | 70 |
| Type | Ref. Ex. 21 | Ref. Ex. 19 | GPPS | Ref. Ex. 32 | Ref. Ex. 32 |
| wt % | 67 | 67 | 33 | 30 | 25 |
| Type |  |  | E640N |  | Ref. Ex. 33 |
| wt % |  |  | 0.5 |  | 5 |
| Lowest temperature at which loss tangent value reaches maximum value within a range of from 60 to 110° C.: T (° C.) | 88.2 | 91.8 | 87.0 | 88.5 | 89.3 |
| Highest maximum value of loss tangent value: Xmax | 2.13 | 2.51 | 1.72 | 1.55 | 1.51 |
| Loss tangent value at a temperature of (T − 10)° C.: Y | 0.53 | 0.77 | 0.65 | 0.57 | 0.53 |
| Loss tangent value at a temperature of (T − 30)° C.: Z | 0.10 | 0.15 | 0.13 | 0.09 | 0.09 |
| Y/Xmax × 100 (%) | 24.9 | 30.7 | 37.8 | 36.8 | 35.1 |
| Z/Xmax × 100 (%) | 4.69 | 5.98 | 7.56 | 5.81 | 5.96 |
| Heat shrinkage factor |  |  |  |  |  |
| Orienting temperature (° C.) | 90 | 90 | 96 | 93 | 93 |
| Shrinkage factor (%, 70° C., 30 sec.) | 21 | 22 | 16 | 17 | 17 |

TABLE 12-continued

|  | Ex. 35 | Ex. 36 | Ex. 37 | Ex. 38 | Ex. 39 |
|---|---|---|---|---|---|
| Spontaneous shrinkage factor (%, 30° C., 30 days) | 0.7 | 0.8 | 0.5 | 0.5 | 0.7 |
| Film formation property (occurrence of failure in outer appearance such as wrinkles or dry scaly skin) | ○ | ○ | ○ | ○ | ○ |

For evaluation of the heat shrinkable (multilayer) film made of block copolymer compositions having different dynamic viscoelasticity behaviors to the temperature, the temperature at which the loss tangent value of the block copolymer used as a raw material reaches the maximum and highest value, the loss tangent value at a temperature lower by 10° C. than the temperature for the highest value and its proportion to the highest value, and the loss tangent value at a temperature lower by 30° C. and its proportion to the highest value, are shown as Reference Examples in Table 13. As evident from this Table, it is found that the dynamic viscoelasticity behaviors of each of the block copolymers of Reference Examples are within specific ranges relative to a temperature change.

In Tables 14 to 16, the combination and the formulation proportion of block copolymers having different dynamic viscoelasticity behaviors to the temperature, and the difference in temperature at which the loss tangent value of each of the block copolymer components reaches the highest and maximum value, are shown and further, Examples wherein the heat shrinkage factor and the spontaneous shrinkage factor of a heat shrinkable film and a heat shrinkable multilayer film were measured while changing the orienting temperature are shown, and Comparative Examples are also shown.

By comparison of values in Tables 14 to 16, it is found that the heat shrinkable film and the heat shrinkable multilayer film made of a composition comprising block copolymers having a difference in temperature at which the loss tangent value reaches the maximum and highest value of at least 3° C., selected among the block copolymers which show specific dynamic viscoelasticity behaviors, have a wide range of the temperature for film formation and satisfy favorable film formation property, while they have favorable heat shrinkability and spontaneous shrinkage resistance.

TABLE 13

|  | Ref. Ex. 22 | Ref. Ex. 23 |
|---|---|---|
| Temperature at which loss tangent value reaches the maximum and highest value: T (° C.) | 92.6 | 81.2 |
| Highest loss tangent value at temperature T: X | 2.42 | 2.76 |
| Loss tangent value at a temperature lower by 10° C. than temperature T: Y | 0.752 | 0.612 |
| Loss tangent value at a temperature lower by 30° C. than temperature T: Z | 0.1440 | 0.0452 |
| Y/X × 100 (%) | 31.1 | 22.2 |
| Z/X × 100 (%) | 5.95 | 1.64 |

TABLE 14

|  | Ex. 40 | Ex. 41 | Ex. 42 | Ex. 43 | Ex. 44 | Ex. 45 | Ex. 46 | Ex. 47 |
|---|---|---|---|---|---|---|---|---|
| Block copolymer (A) (i) | Ref. Ex. 12 | Ref. Ex. 12 | Ref. Ex. 4 | Ref. Ex. 4 | Ref. Ex. 1 | Ref. Ex. 22 | Ref. Ex. 1 | Ref. Ex. 23 |
| Block copolymer (A) or (A2) (ii) | Ref. Ex. 22 | Ref. Ex. 4 | Ref. Ex. 22 | Ref. Ex. 9 | Ref. Ex. 4 | Ref. Ex. 3 | Ref. Ex. 3 | Ref. Ex. 3 |
| Vinyl aromatic hydrocarbon polymer (B) (iii) |  |  |  |  |  |  | E640N |  |
| Copolymers blended | (i):(ii) | (i):(ii) | (i):(ii) | (i):(ii) | (i):(ii) | (i):(ii) | (i):(ii) | (i):(ii) |
| Weight ratio | 30:70 | 60:40 | 30:70 | 70:30 | 30:70 | 70:30 | 70:29:1 | 60:40 |
| Difference in temperature at which loss tangent value reaches the highest and maximum value T(ii) − T(i) (° C.) | 17.6 | 9.6 | 8.0 | 23.4 | 4.1 | 12.4 | 24.5 | 23.8 |
| Heat shrinkage factor at 70° C. for 30 sec. (%) |  |  |  |  |  |  |  |  |
| Orienting temperature |  |  |  |  |  |  |  |  |
| 87° C. | 27 | 28 | 25 | 22 | 25 | 20 | 22 | 22 |
| 90° C. | 24 | 28 | 22 | 19 | 21 | 18 | 20 | 20 |
| 93° C. | 20 | 18 | 18 | 15 | 19 | 16 | 16 | 18 |
| 96° C. | 18 | 15 | 15 | 12 | 16 | 12 | 12 | 17 |
| Spontaneous shrinkage factor (30° C., 30 days) (%) | 0.8 | 1.0 | 0.7 | 0.9 | 0.9 | 1.2 | 1.0 | 0.9 |

Spontaneous shrinkage factor: Measured by using a film oriented at 90° C.

TABLE 15

|  | Comp. Ex. 8 |
|---|---|
| Block copolymer (A) (i) |  |
| Block copolymer (A2) (ii) | Ref. Ex. 9 |
| Block copolymer (A2) or another (iii) | Ref. Ex. 15 |
| Copolymers blended | (ii):(iii) |
| Weight ratio | 30:70 |
| Difference in temperature at which loss tangent value reaches the highest and maximum value T(ii) − T(i) or T(ii) − T(iii) or T(iii) − T(i) (° C.) | 24.8 |
| Heat shrinkage factor at 70° C. for 30 sec. (%) Orienting temperature |  |
| 87° C. | 24 |
| 90° C. | 21 |
| 93° C. | 18 |
| 96° C. | 15 |
| Spontaneous shrinkage factor (30° C., 30 days) (%) | 2.8 |

Spontaneous shrinkage factor: Measured by using a film oriented at 90° C.

TABLE 16

|  | Ex. 48 | Ex. 49 | Ex. 50 | Ex. 51 |
|---|---|---|---|---|
| Surface layer and rear layer |  |  |  |  |
| Blended resin (iv) | 730L | Ex. 40 | Ref. Ex. 32 | 730L |
| Blended resin (v) | E640N |  | Ref. Ex. 33 | Returned material |
| Blended ratio (iv):(v) | 99:1 | 100:0 | 70:30 | 70:30 |
| Intermediate layer |  |  |  |  |
| Blended resin (vi) | Ex. 40 | 730L | Ex. 40 | Ex. 40 |
| Blended resin (vii) |  |  | Ref. Ex. 32 | Returned material |
| Blended ratio (vi):(vii) | 100:0 | 100:0 | 90:10 | 70:30 |
| Thickness ratio of surface/intermediate/rear layers | 10/80/10 | 10/80/10 | 10/80/10 | 10/80/10 |
| Heat shrinkage factor at 70° C. for 30 sec. (%) Orienting temperature |  |  |  |  |
| 87° C. | 26 | 22 | 26 | 25 |
| 90° C. | 22 | 20 | 21 | 22 |
| 93° C. | 19 | 18 | 19 | 18 |
| 96° C. | 18 | 16 | 18 | 17 |
| Spontaneous shrinkage factor (30° C., 30 days) (%) | 0.9 | 1.4 | 1.0 | 1.0 |

Spontaneous shrinkage factor: Measured by using a film oriented at 90° C.
Returned material: Heat shrinkable multilayer film of Ex. 51 pulverized and then re-extruded For evaluation of the heat shrinkable (multilayer) film made of block copolymer compositions having different weight average molecular weights, the temperature at which the loss tangent value of the block copolymer used as a part of raw materials reaches the maximum and highest value, the loss tangent value at a temperature lower by 10° C. than the temperature for the highest value and its proportion to the highest value, and the loss tangent value at a temperature lower by 30° C. and its proportion to the highest value, are shown as Reference Examples in Table 17. From this Table, it is found that the dynamic viscoelasticity behaviors of each of the block copolymers in Reference Examples are within specific ranges relative to the temperature change.

The dynamic viscoelasticity behaviors of the composition composed mainly of block copolymers having different weight average molecular weights, and the outer appearance at the time of film formation, the heat shrinkage factor and the spontaneous shrinkage factor of a heat shrinkable (multilayer) film formed by orientation while changing the temperature, were measured and are shown in Tables 18 to 21 as Examples.

From the results shown in Tables 18 to 21, it is found that the composition of the block copolymers which have a certain difference in the weight average molecular weight and which satisfy the standards of the dynamic viscoelasticity, is excellent in spontaneous shrinkability while it has favorable film formation property and low temperature heat shrinkability.

TABLE 17

|  | Ref. Ex. 24 | Ref. Ex. 26 | Ref. Ex. 29 | Ref. Ex. 30 |
|---|---|---|---|---|
| Temperature at which loss tangent value reaches the maximum and highest value: T (° C.) | 74.6 | 73.1 | 105.1 | 78.5 |
| Highest loss tangent value at temperature T: X | 2.74 | 2.61 | 2.37 | 2.68 |

TABLE 17-continued

|  | Ref. Ex. 24 | Ref. Ex. 26 | Ref. Ex. 29 | Ref. Ex. 30 |
|---|---|---|---|---|
| Loss tangent value at a temperature lower by 10° C. than temperature T: Y | 0.524 | 0.507 | 0.563 | 0.518 |
| Loss tangent value at a temperature lower by 30° C. than temperature T: Z | 0.0860 | 0.0819 | 0.123 | 0.0834 |
| Y/X × 100 (%) | 19.1 | 19.4 | 23.8 | 19.3 |
| Z/X × 100 (%) | 3.14 | 3.14 | 5.19 | 3.11 |

TABLE 18

|  | Ex. 52 | Ex. 53 | Ex. 54 | Ex. 55 | Ex. 56 | Ex. 57 |
| --- | --- | --- | --- | --- | --- | --- |
| Block copolymer (A) | Ref. Ex. 24 | Ref. Ex. 26 | Ref. Ex. 24 | Ref. Ex. 29 | Ref. Ex. 30 | Ref. Ex. 24 |
| Weight average molecular weight of (A) (Mw1) | 204,000 | 151,000 | 204,000 | 182,000 | 252,000 | 204,000 |
| Block copolymer (A3) | Ref. Ex. 25 | Ref. Ex. 27 | Ref. Ex. 25 | Ref. Ex. 25 | Ref. Ex. 31 | Ref. Ex. 25 |
| Weight average molecular weight of (A3) (Mw2) | 127,000 | 119,000 | 127,000 | 127,000 | 49,000 | 127,000 |
| Blend ratio of (A) to (A3) by weight (A):(A3) | 70:30 | 70:30 | 70:30 | 30:70 | 70:30 | 70:30 |
| Mw2/Mw1 | 0.62 | 0.79 | 0.62 | 0.70 | 0.19 | 0.62 |
| Temperature at which loss tangent value reaches a maximum value at a temperature of at least 60° C.: T(° C.) | 79 | 84 | 79 | 92 | 85 | 79 |
| Loss tangent value at temperature T: X | 2.5 | 2.5 | 2.5 | 2.3 | 2.3 | 2.5 |
| Loss tangent value at a temperature lower by 10° C. than temperature T: Y | 0.74 | 0.72 | 0.74 | 0.80 | 0.84 | 0.74 |
| Loss tangent value at a temperature lower by 30° C. than temperature T: Z | 0.14 | 0.14 | 0.14 | 0.14 | 0.19 | 0.14 |
| Y/X × 100 (%) | 29.6 | 28.8 | 29.6 | 34.8 | 36.5 | 29.6 |
| Z/X × 100 (%) | 5.6 | 5.6 | 5.6 | 6.1 | 8.3 | 5.6 |
| Vinyl aromatic hydrocarbon polymer composition (B) |  |  |  |  |  |  |
| Type of resin/blend ratio based on 100 parts by weight of compositions (A) and (A3) | Nil | Nil | GPPS/10 | Nil | Nil | Ref. Ex. 32/10 HIPS/1 |

TABLE 19

|  | Comp. Ex. 9 | Comp. Ex. 10 | Comp. Ex. 11 | Comp. Ex. 12 |
| --- | --- | --- | --- | --- |
| Block copolymer (A) | Ref. Ex. 26 | Ref. Ex. 24 | Ref. Ex. 26 | Ref. Ex. 26 |
| Weight average molecular weight of (A) (Mw1) | 151,000 | 204,000 | 151,000 | 151,000 |
| Block copolymer (A3) | Ref. Ex. 28 | Ref. Ex. 25 | Ref. Ex. 27 | Ref. Ex. 27 |
| Weight average molecular weight of (A3) (Mw2) | 139,000 | 127,000 | 119,000 | 119,000 |
| Blend ratio of (A) to (A3) by weight (A):(A3) | 70:30 | 95:5 | 30:70 | 5:95 |
| Mw2/Mw1 | 0.92 | 0.62 | 0.79 | 0.79 |
| Temperature at which loss tangent value reaches a maximum value at a temperature of at least 60° C.: T(° C.) | 77 | 77 | 94 | 100 |
| Loss tangent value at temperature T: X | 2.7 | 2.6 | 2.1 | 1.9 |
| Loss tangent value at a temperature lower by 10° C. than temperature T: Y | 0.65 | 0.75 | 0.88 | 0.97 |
| Loss tangent value at a temperature lower by 30° C. than temperature T: Z | 0.13 | 0.15 | 0.19 | 0.21 |
| Y/X × 100 (%) | 24.1 | 28.8 | 41.9 | 51.1 |
| Z/X × 100 (%) | 4.8 | 5.8 | 9.0 | 11.1 |
| Vinyl aromatic hydrocarbon polymer composition (B) |  |  |  |  |
| Type of resin/blend ratio based on 100 parts by weight of compositions (A) and (A3) | Nil | Nil | Nil | Nil |

TABLE 20

|  | Orienting temperature | Ex. 52 | Ex. 53 | Ex. 54 | Ex. 55 | Ex. 56 | Ex. 57 |
| --- | --- | --- | --- | --- | --- | --- | --- |
| Heat shrinkage factor at 70° C. for 30 sec. (%) / | 78° C. | X |  |  |  | X | X |
|  | 81° C. | 32/Δ | 33/Δ | 30/Δ |  | 29/Δ | 28/Δ |
|  | 84° C. | 26/○ | 28/○ | 24/○ | X | 24/○ | 25/○ |

TABLE 20-continued

|  |  | Ex. 52 | Ex. 53 | Ex. 54 | Ex. 55 | Ex. 56 | Ex. 57 |
|---|---|---|---|---|---|---|---|
| Film formation property | 87° C. | 23/○ | 23/○ | 22/○ | 29/Δ | 19/○ | 23/○ |
| (outer appearance of | 90° C. | 20/○ | 20/○ | 20/○ | 24/○ | 13/○ | 19/○ |
| oriented film) | 93° C. | X | 18/○ | X | 22/○ | 10/○ | X |
|  | 96° C. |  | X |  | 19/○ | X |  |
|  | 99° C. |  |  |  | 16/○ |  |  |
|  | 102° C. |  |  |  | X |  |  |
| Orienting temperature (° C.) |  | 84 | 84 | 84 | 90 | 84 | 84 |
| Spontaneous shrinkage factor (%) |  | 0.7 | 1.2 | 0.7 | 1.2 | 1.1 | 0.7 |

TABLE 21

|  |  | Comp. Ex. 9 | Comp. Ex. 10 | Comp. Ex. 11 | Comp. Ex. 12 |
|---|---|---|---|---|---|
|  | Orienting temperature |  |  |  |  |
| Heat shrinkage factor at | 78° C. | X | X |  |  |
| 70° C. for 30 sec. (%) | 81° C. | 30/Δ | 28/Δ |  |  |
| / | 84° C. | 26/Δ | 24/Δ | X |  |
| Film formation property | 87° C. | 22/Δ | 20/Δ | 25/Δ | X |
| (outer appearance of | 90° C. | X | 15/Δ | 18/○ | 20/Δ |
| oriented film) | 93° C. |  | X | 16/○ | 14/○ |
|  | 96° C. |  |  | 13/○ | 10/○ |
|  | 99° C. |  |  | 10/○ | 8/○ |
|  | 102° C. |  |  | X | X |
| Orienting temperature (° C.) |  | 84 | 84 | 90 | 93 |
| Spontaneous shrinkage factor (%) |  | 0.7 | 0.7 | 1.8 | 3.6 |

TABLE 22

|  | CLEAREN 730L* |
|---|---|
| Weight average molecular weight of (A) (Mw1) | 180,000 |
| Weight average molecular weight of (B) (Mw2) | 70,000 |
| Mw2/Mw1 | 0.39 |
| Temperature at which loss tangent value reaches a maximum value at a temperature of at least 60° C.: T(° C.) | 107 |
| Loss tangent value at temperature T: X | 1.5 |
| Loss tangent value at a temperature lower by 10° C. than temperature T: Y | 0.59 |
| Loss tangent value at a temperature lower by 30° C. than temperature T: Z | 0.19 |
| Y/X × 100 (%) | 39.3 |
| Z/X × 100 (%) | 12.7 |

*Lot 900315

Industrial Applicability

The block copolymer wherein the loss tangent value obtained by dynamic viscoelasticity measurement has a specific relation to the temperature, and the heat shrinkable (multilayer) film composed mainly of the copolymer composition containing the block copolymer as an essential component of the present invention, have remarkably improved spontaneous shrinkage resistance without their original heat shrinkability being impaired, and are suitable for e.g. a heat shrinkable label, a heat shrinkable cap seal, a protective film for bottles, a pack guard shrink packaging, or an electrical insulating coating for e.g. capacitors and dry batteries.

What is claimed is:

1. A block copolymer (A) comprising a vinyl aromatic hydrocarbon and a conjugated diene, wherein the relation of the loss tangent value obtained by dynamic viscoelasticity measurement to the temperature satisfies the following conditions:

(1) there is at least one maximum value within a temperature range of from 60 to 110° C.,
(2) the value of loss tangent at a temperature lower by 10° C. than the lowest temperature for the maximum value is at most 40% of the highest maximum value, and
(3) the value of loss tangent at a temperature lower by 30° C. than the lowest temperature is at most 10% of the highest maximum value.

2. The block copolymer (A) according to claim 1, wherein in the relation of the loss tangent value obtained by dynamic viscoelasticity measurement to the temperature, there is at least one maximum value within a temperature range of from 65 to 100° C., and the conditions (2) and (3) defined are satisfied.

3. The block copolymer (A) according to claim 1, wherein in the relation of the loss tangent value obtained by dynamic viscoelasticity measurement to the temperature, the highest maximum value of loss tangent within a temperature range of from 60 to 110° C. is within a range of from 0.5 to 4.0, and the loss tangent value at 30° C. is within a range of at least 0.01 and less than 0.4.

4. The block copolymer (A) according to claim 1, wherein the molecular structure is represented by the following formula, its weight average molecular weight is from 100,000 to 300,000, and the following conditions (a) to (c) are satisfied:

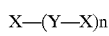

wherein n is an integer of at least 1:
(a) X is a block having a chain comprising one type or at least two types of vinyl aromatic hydrocarbons,
(b) Y is a block containing at least one random copolymer segment of a conjugated diene and a vinyl aromatic hydrocarbon, each being of one type or at least two types, having a weight average molecular weight of from 40,000 to 250,000, and (c) when a molecular weight distribution of a polymer mixture comprising a vinyl aromatic hydrocarbon obtained by ozonolysis of the block copolymer is measured, the relation between the weight average molecular weight (Mw') of the polymer component showing the highest peak and the weight average molecular weight (Mw) of the block copolymer before the treatment is $0.1 \leq Mw'/Mw \leq 0.4$.

5. A block copolymer composition containing at least two types of the different block copolymers (A) which satisfy the conditions as defined in claim 1.

6. A block copolymer composition containing at least two types of the different block copolymers (A) which satisfy the conditions as defined in claim 1, wherein the relation of the loss tangent value obtained by dynamic viscoelasticity measurement of the composition to the temperature satisfies conditions (1) there is at least one maximum value within a temperature range of from 60 to 110° C., (2) the value of loss tangent at a temperature lower by 10° C. than the lowest temperature for the maximum value is at most 40% of the highest maximum value, and (3) the value of loss tangent at a temperature lower by 30° C. than the lowest temperature is at most 10% of the highest maximum value.

7. A block copolymer composition containing at least two types of the different block copolymers (A) which satisfy the conditions as defined in claim 4, wherein the relation of the loss tangent value obtained by dynamic viscoelasticity measurement to the temperature satisfies conditions (1) there is at least one maximum value within a temperature range of from 60 to 110° C., (2) the value of loss tangent at a temperature lower by 10° C. than the lowest temperature for the maximum value is at most 40% of the highest maximum value, and (3) the value of loss tangent at a temperature lower by 30° C. than the lowest temperature is at most 10% of the highest maximum value.

8. A block copolymer composition containing the block copolymer (A) as defined in claim 1 and a vinyl aromatic hydrocarbon polymer containing at least one member selected from the following polymers (B1) to (B3):

(B1) a vinyl aromatic hydrocarbon polymer, (B2) a block copolymer of a vinyl aromatic hydrocarbon and a conjugated diene (excluding the block copolymer (A)), (B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (a) forms a continuous phase and the rubber-like elastic body (b) forms a disperse phase, and the weight ratio is (a)/(b)=60/40 to 97/3.

9. A block copolymer composition containing the block copolymer (A) as defined in claim 1 and a vinyl aromatic hydrocarbon polymer containing at least one member selected from the following polymers (B1) to (B3), wherein the relation of the loss tangent value obtained by dynamic viscoelasticity measurement of the composition to the temperature satisfies the conditions (1) to (3) defined:

(B1) a vinyl aromatic hydrocarbon polymer, (B2) a block copolymer of a vinyl aromatic hydrocarbon and a conjugated diene (excluding the block copolymer (A)), (B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (a) forms a continuous phase and the rubber-like elastic body (b) forms a disperse phase, and the weight ratio is (a)/(b)=60/40 to 97/3.

10. A block copolymer composition comprising a composition of the block copolymer (A) as defined in claim 1 and the following block copolymer (A2) in a compositional ratio by weight of $0.1 \leq A/(A+A2) \leq 0.95$:

the block copolymer (A2) is a block copolymer of a vinyl aromatic hydrocarbon and a conjugated diene, wherein in the relation of the loss tangent value obtained by dynamic viscoelasticity measurement to the temperature, there is at least one maximum value within a temperature range of from 63 to 120° C., and the lowest temperature for the maximum value of the loss tangent value within said range is higher by at least 3° C. than the lowest temperature for the maximum value of the loss tangent value of the block copolymer (A).

11. A block copolymer composition comprising a composition of the block copolymer (A) as defined in claim 1 and the following block copolymer (A2) in a compositional ratio by weight of $0.1 \leq A/(A+A2) \leq 0.95$, wherein the relation of the loss tangent value obtained by dynamic viscoelasticity measurement of the composition to the temperature satisfies the conditions (1) to (3) defined:

the block copolymer (A2) is a block copolymer of a vinyl aromatic hydrocarbon and a conjugated diene, wherein in the relation of the loss tangent value obtained by dynamic viscoelasticity measurement to the temperature, there is at least one maximum value within a temperature range of from 63 to 120° C., and the lowest temperature for the maximum value of the loss tangent value within said range is higher by at least 3° C. than the lowest temperature for the maximum value of the loss tangent value of the block copolymer (A).

12. A composition containing the block copolymer composition as defined in claim 10 and at least one vinyl aromatic hydrocarbon polymer selected from the following polymers (B1) to (B3) in an amount of at most 100 parts by weight based on 100 parts by weight of the block copolymer composition:

(B1) a vinyl aromatic hydrocarbon polymer, (B2) a block copolymer of a vinyl aromatic hydrocarbon and a conjugated diene (excluding the block copolymer (A) and the block copolymer (A2)), (B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (a) forms a continuous phase and the rubber-like elastic body (b) forms a disperse phase, and the weight ratio is (a)/(b)=60/40 to 97/3.

13. A composition containing the block copolymer composition as defined in claim 10 and at least one vinyl aromatic hydrocarbon polymer selected from the following polymers (B1) to (B3) in an amount of at most 100 parts by weight based on 100 parts by weight of the block copolymer composition, wherein the relation of the loss tangent value obtained by dynamic viscoelasticity measurement of the composition to the temperature satisfies conditions (1) there is at least one maximum value within a temperature range of from 60 to 110° C., (2) the value of loss tangent at a temperature lower by 10° C. than the lowest temperature for the maximum value is at most 40% of the highest maximum value, and (3) the value of loss tangent at a temperature lower by 30° C. than the lowest temperature is at most 10% of the highest maximum value:

(B1) a vinyl aromatic hydrocarbon polymer,
(B2) a block copolymer of a vinyl aromatic hydrocarbon and a conjugated diene (excluding the block copolymer (A) and the block copolymer (A2)),
(B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (a) forms a continuous phase and the rubber-like elastic body (b) forms a disperse phase, and the weight ratio is (a)/(b)=60/40 to 97/3.

14. A block copolymer composition comprising the block copolymer (A) comprising a vinyl aromatic hydrocarbon and a conjugated diene as defined in claim 1 and having a weight average molecular weight Mw1 within a range of 100,000≦Mw1≦300,000, and a block copolymer (A3) comprising a vinyl aromatic hydrocarbon and a conjugated diene and having a weight average molecular weight Mw2 in relation to Mw1 within a range of 0.1 ≦Mw2/Mw1≦0.85, wherein the compositional ratio by weight of (A) to (A3) is within a range of 0.1<A/(A+A3)<0.9.

15. A block copolymer composition comprising the block copolymer (A) comprising a vinyl aromatic hydrocarbon and a conjugated diene as defined in claim 1 and having a weight average molecular weight Mw1 within a range of 100,000≦Mw1≦300,000, and a block copolymer (A3) comprising a vinyl aromatic hydrocarbon and a conjugated diene and having a weight average molecular weight Mw2 in relation to Mw1 within a range of 0.1 ≦Mw2/Mw1≦0.85, wherein the compositional ratio by weight of (A) to (A3) is within a range of 0.1<A/(A+A3)<0.9, and wherein the relation of the loss tangent value obtained by dynamic viscoelasticity measurement of the composition to the temperature satisfies conditions (1) there is at least one maximum value within a temperature range of from 60 to 110° C., (2) the value of loss tangent at a temperature lower by 10° C. than the lowest temperature for the maximum value is at most 40% of the highest maximum value, and (3) the value of loss tangent at a temperature lower by 30° C. than the lowest temperature is at most 10% of the highest maximum value.

16. A composition containing the block copolymer composition as defined in claim 4 and a vinyl aromatic hydrocarbon polymer containing at lest one of the following (B1) to (B3) in an amount of at most 100 parts by weight based on 100 parts by weight of the block copolymer composition:

(B1) a vinyl aromatic hydrocarbon polymer,
(B2) a block copolymer of a vinyl aromatic hydrocarbon and a conjugated diene (excluding the block copolymer (A) and the block copolymer (A3)),
(B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (a) forms a continuous phase and the rubber-like elastic body (b) forms a disperse phase, and the weight ratio is (a)/(b)=60/40 to 97/3.

17. A composition containing the block copolymer composition as defined in claim 8 and a vinyl aromatic hydrocarbon polymer containing at least one of the following (B1) to (B3) in an amount of at most 100 parts by weight based on 100 parts by weight of the block copolymer composition, wherein the relation of the loss tangent value obtained by dynamic viscoelasticity measurement of the composition to the temperature satisfies conditions (1) there is at least one maximum value within a temperature range of from 60 to 110° C., (2) the value of loss tangent at a temperature lower by 10° C. than the lowest temperature for the maximum value is at most 40% of the highest maximum value, and (3) the value of loss tangent at a temperature lower by 30° C. than the lowest temperature is at most 10% of the highest maximum value:

(B1) a vinyl aromatic hydrocarbon polymer,
(B2) a block copolymer of a vinyl aromatic hydrocarbon and a conjugated diene (excluding the block copolymer (A) and the block copolymer (A3)),
(B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (A) forms a continuous phase and the rubber-like elastic body (b) forms a disperse phase, and the weight ratio is (a)/(b)=60/40 to 97/3.

18. A film or sheet made of the block copolymer or the copolymer composition as defined in claim 1.

19. A heat shrinkable film made of the block copolymer or the block copolymer composition as defined in claim 1.

20. A heat shrinkable film obtained by orienting the film or sheet as defined in claim 18.

21. A multilayer film or multilayer sheet having at least one layer made of the block copolymer or the copolymer composition as defined in claim 1.

22. A heat shrinkable multilayer film employing the block copolymer or the block copolymer composition as defined in claim 8 for at lest one layer.

23. A heat shrinkable multilayer film obtained by orienting the multilayer film or multilayer sheet as defined in claim 21.

24. A multilayer film or multilayer sheet having a layer containing the block copolymer (A) as defined in claim 5, as a surface layer, and a layer formed by a vinyl aromatic hydrocarbon polymer containing at least one member selected from the following polymers (B1) to (B3), as a layer other than the surface layer:

(B1) a vinyl aromatic hydrocarbon polymer,
(B2) a block copolymer of a vinyl aromatic hydrocarbon and a conjugated diene (excluding the block copolymer (A)),
(B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (a) forms a continuous phase and the rubber-like elastic body (b) forms a disperse phase, and the weight ratio is (a)/(b)=60/40 to 97/3.

25. A multilayer film or multilayer sheet having a layer formed by a vinyl aromatic hydrocarbon polymer containing at least one member selected from the following polymers (B1) to (B3), as a surface layer, and a layer containing the block copolymer (A) as defined in claim 5, as a layer other than the surface layer:

(B1) a vinyl aromatic hydrocarbon polymer, (B2) a block copolymer of a vinyl aromatic hydrocarbon and a conjugated diene (excluding the block copolymer (A)), (B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (a) forms a continuous phase and the rubber-like elastic body (b) forms a disperse phase, and the weight ratio is (a)/(b)=60/40 to 97/3.

26. A heat shrinkable multilayer film obtained by orienting the multilayer film or multilayer sheet as defined in claim 24.

27. A heat shrinkable multilayer film obtained by orienting the multilayer film or multilayer sheet as defined in claim 25.

28. A multilayer film or multi layer sheet having at least one layer obtained by mixing 100 parts by weight of a composition composed mainly of a block copolymer (A), with at most 50 parts by weight (0 part by weight not included) of a resin mixture forming the multilayer film or multilayer sheet and/or the heat shrinkable multilayer film as defined in claim 23, said block copolymer (A) comprising a vinyl aromatic hydrocarbon and a conjugated diene, and having a relation of the loss tangent value obtained by dynamic viscoelasticity measurement to the temperature which satisfies the following conditions (1) to (3):

(1) there is at least one maximum value within a temperature range of from 60 to 110° C., (2) the value of loss tangent at a temperature lower by 10° C. than the lowest temperature for the maximum value is at most 40% of the highest maximum value, and (3) the value of loss tangent at a temperature lower by 30° C. than the lowest temperature is at most 10% of the highest maximum value.

29. A multilayer film or multilayer sheet obtained by mixing 100 parts by weight of a vinyl aromatic hydrocarbon polymer containing at least one member selected from the following polymers (B1) to (B3) with at most 50 parts by weight (0 part by weight not included) of a resin mixture forming the multilayer film or multilayer sheet and/or the heat shrinkable multilayer film as defined in claim 23:

(B1) a vinyl aromatic hydrocarbon polymer, (B2) a block copolymer of a vinyl aromatic hydrocarbon and a conjugated diene, (B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (a) forms a continuous phase and the rubber-like elastic body (b) forms a disperse phase, and the weight ratio is (a)/(b)=60/40 to 97/3.

30. A heat shrinkable multilayer film obtained by orienting the multilayer film or multilayer sheet as defined in claim 28.

31. A heat shrinkable multilayer film obtained by orienting the multilayer film or multilayer sheet as defined in claim 29.

32. A method for producing the block copolymer (A) as defined in claim 1, which comprises a step of adding a vinyl aromatic hydrocarbon and/or a conjugated diene as a monomer as mixed or separately, simultaneously, and intermittently or continuously, to the reaction system so that the feed rate of the monomer is substantially lower than the polymerization reaction rate, to polymerize the random copolymer segment, in anionic polymerization employing an organic lithium compound as the polymerization initiator in an organic solvent.

33. A method for producing the block copolymer (A) as defined in claim 1, which comprises a step of adding a vinyl aromatic hydrocarbon and/or a conjugated diene as a monomer as mixed or separately, simultaneously, and intermittently or continuously, in the presence of a randomizing agent to polymerize the random copolymer segment, in anionic polymerization employing an organic lithium compound as the polymerization initiator in an organic solvent.

34. A film or sheet made of the block copolymer or the copolymer composition as defined in claim 5.

35. A film or sheet made of the block copolymer or the copolymer composition as defined in claim 8.

36. A heat shrinkable film made of the block copolymer or the block copolymer composition as defined in claim 5.

37. A heat shrinkable film made of the block copolymer or the block copolymer composition as defined in claim 8.

38. A heat shrinkable film obtained by orienting the film or sheet as defined in claim 34.

39. A heat shrinkable film obtained by orienting the film or sheet as defined in claim 35.

40. A multilayer film or multilayer sheet having at least one layer made of the block copolymer or the copolymer composition as defined in claim 5.

41. A multilayer film or multilayer sheet having at least one layer made of the block copolymer or the copolymer composition as defined in claim 8.

42. A heat shrinkable multilayer film obtained by orienting the multilayer film or multilayer sheet as defined in claim 40.

43. A heat shrinkable multilayer film obtained by orienting the multilayer film or multilayer sheet as defined in claim 41.

44. A multilayer film or multilayer sheet having at least one layer obtained by mixing 100 parts by weight of a composition composed mainly of a block copolymer (A), with at most 50 parts by weight (0 part by weight not included) of a resin mixture forming the multilayer film or multilayer sheet and/or the heat shrinkable multilayer film as defined in claim 42, said block copolymer (A) comprising a vinyl aromatic hydrocarbon and a conjugated diene, and having a relation of the loss tangent value obtained by dynamic viscoelasticity measurement to the temperature which satisfies the following conditions (1) to (3):

(1) there is at least one maximum value within a temperature range of from 60 to 110° C., (2) the value of loss tangent at a temperature lower by 10° C. than the lowest temperature for the maximum value is at most 40% of the highest maximum value, and (3) the value of loss tangent at a temperature lower by 30° C. than the lowest temperature is at most 10% of the highest maximum value.

45. A multilayer film or multilayer sheet having at least one layer obtained by mixing 100 parts by weight of a composition composed mainly of a block copolymer (A), with at most 50 parts by weight (0 part by weight not included) of a resin mixture forming the multilayer film or multilayer sheet and/or the heat shrinkable multilayer film as defined in claim 43, said block copolymer (A) comprising a vinyl aromatic hydrocarbon and a conjugated diene, and having a relation of the loss tangent value obtained by dynamic viscoelasticity measurement to the temperature which satisfies the following conditions (1) to (3):

(1) there is at least one maximum value within a temperature range of from 60 to 110° C., (2) the value of loss tangent at a temperature lower by 10° C. than the lowest temperature for the maximum value is at most 40% of the highest maximum value, and (3) the value of loss tangent at a temperature lower by 30° C. than the lowest temperature is at most 10% of the highest maximum value.

46. A multilayer film or multilayer sheet obtained by mixing 100 parts by weight of a vinyl aromatic hydrocarbon polymer containing at least one member selected from the following polymers (B1) to (B3) with at most 50 parts by weight (0 part by weight not included) of a resin mixture forming the multilayer film or multilayer sheet and/or the heat shrinkable multilayer film as defined in claim 42:

(B1) a vinyl aromatic hydrocarbon polymer, (B2) a block copolymer of a vinyl aromatic hydrocarbon and a conjugated diene, (B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (a) forms a continuous phase and the rubber-like elastic body (b) forms a disperse phase, and the weight ratio is (a)/(b)=60/40 to 97/3.

47. A multilayer film or multilayer sheet obtained by mixing 100 parts by weight of a vinyl aromatic hydrocarbon polymer containing at least one member selected from the following polymers (B1) to (B3) with at most 50 parts by weight (0 part by weight not included) of a resin mixture forming the multilayer film or multilayer sheet and/or the heat shrinkable multilayer film as defined in claim 43:

(B1) a vinyl aromatic hydrocarbon polymer, (B2) a block copolymer of a vinyl aromatic hydrocarbon and a conjugated diene, (B3) a rubber-modified transparent resin which is a composition of a copolymer (a) comprising a vinyl aromatic hydrocarbon and a (meth)acrylate and having a refractive index of from 1.550 to 1.580 at a temperature of 23° C., and a rubber-like elastic body (b) having a refractive index of from 1.535 to 1.550 at a temperature of 23° C., wherein the copolymer (a) forms a continuous phase and the rubber-like elastic body (b) forms a disperse phase, and the weight ratio is (a)/(b)=60/40 to 97/3.

48. A heat shrinkable multilayer film obtained by orienting the multilayer film or multilayer sheet as defined in claim 44.

49. A heat shrinkable multilayer film obtained by orienting the multilayer film or multilayer sheet as defined in claim 45.

50. A heat shrinkable multilayer film obtained by orienting the multilayer film or multilayer sheet as defined in claim 46.

51. A heat shrinkable multilayer film obtained by orienting the multilayer film or multilayer sheet as defined in claim 47.

* * * * *